US 9,632,640 B2

(12) United States Patent
Kanna et al.

(10) Patent No.: US 9,632,640 B2
(45) Date of Patent: Apr. 25, 2017

(54) TRANSPARENT LAMINATE, CAPACITANCE TYPE INPUT DEVICE, AND IMAGE DISPLAY DEVICE

(71) Applicant: FUJIFILM Corporation, Minato-ku, Tokyo (JP)

(72) Inventors: Shinichi Kanna, Fujinomiya (JP); Ryuji Saneto, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 134 days.

(21) Appl. No.: 14/591,726

(22) Filed: Jan. 7, 2015

(65) Prior Publication Data

US 2015/0116270 A1    Apr. 30, 2015

Related U.S. Application Data

(63) Continuation-in-part of application No. 14/585,298, filed on Dec. 30, 2014, which is a continuation of
(Continued)

(30) Foreign Application Priority Data

Jul. 3, 2012   (JP) .................. 2012-149390

(51) Int. Cl.
*B32B 3/10*   (2006.01)
*G06F 3/044*  (2006.01)
(Continued)

(52) U.S. Cl.
CPC ............. *G06F 3/044* (2013.01); *B32B 3/10* (2013.01); *G06F 3/03547* (2013.01);
(Continued)

(58) Field of Classification Search
None
See application file for complete search history.

(56) References Cited

U.S. PATENT DOCUMENTS

2008/0138589 A1   6/2008   Wakabayashi et al.
2010/0225612 A1   9/2010   Ishizaki et al.
(Continued)

FOREIGN PATENT DOCUMENTS

| CN | 1722215 A | 1/2006 |
| CN | 101120304 A | 2/2008 |

(Continued)

OTHER PUBLICATIONS

Machine Translation of JP 2011-167914.*
(Continued)

*Primary Examiner* — Bruce H Hess
*Assistant Examiner* — Christopher Polley
(74) *Attorney, Agent, or Firm* — Sughrue Mion, PLLC

(57) ABSTRACT

Provided is a transparent laminate which does not have a problem in which a transparent electrode pattern is visually recognized, a capacitance type input device having the transparent laminate, and an image display device provided with the capacitance type input device as a constituent element. The transparent laminate of the invention includes a region where a transparent substrate, a first transparent film which contains a metal oxide and has a film thickness of 55 nm to 110 nm, a transparent electrode pattern, and a second transparent film which contains 5 mass % to 80 mass % of metal oxide particles and has a film thickness of 55 nm to 110 nm are laminated in this order in a plane.

26 Claims, 6 Drawing Sheets

Related U.S. Application Data application No. PCT/JP2013/066482, filed on Jun. 14, 2013.

(51) Int. Cl.
*G06F 3/041* (2006.01)
*G06F 3/0354* (2013.01)

(52) U.S. Cl.
CPC ...... *G06F 3/0412* (2013.01); *B32B 2260/025* (2013.01); *B32B 2307/202* (2013.01); *B32B 2457/208* (2013.01); *G06F 2203/04111* (2013.01); *G06F 2203/04112* (2013.01); *Y10T 428/24868* (2015.01)

(56) References Cited

U.S. PATENT DOCUMENTS

| 2010/0259470 A1 | 10/2010 | Kohtoku et al. |
| 2011/0128252 A1 | 6/2011 | Nah |

FOREIGN PATENT DOCUMENTS

| CN | 101889166 A | | 11/2010 |
| JP | 2010-79734 A | | 4/2010 |
| JP | 2010-86684 A | | 4/2010 |
| JP | 2010-152809 A | | 7/2010 |
| JP | 2010231186 A | | 10/2010 |
| JP | 2010-257492 A | | 11/2010 |
| JP | 2011167914 A | * | 9/2011 |
| JP | 2011186717 A | | 9/2011 |
| JP | 2012-81663 A | | 4/2012 |
| JP | 2012071422 A | | 4/2012 |
| JP | 2012088683 A | | 5/2012 |
| KR | 10-2008-0010384 A | | 1/2008 |
| KR | 10-2011-0061422 A | | 6/2011 |
| WO | 2006/126604 A1 | | 11/2006 |
| WO | 2012057165 A1 | | 5/2012 |

OTHER PUBLICATIONS

International Search Report of PCT/JP2013/066482, dated Sep. 17, 2013, 5 pages in Japanese and English.

Written Opinion, dated Sep. 17, 2013, issued in corresponding International Application No. PCT/JP2013/066482, 9 pages in English and Japanese.

International Preliminary Report on Patentability, dated Jan. 6, 2015, issued in corresponding International Application No. PCT/JP2013/066482, 6 pages in English.

Notice of Reasons for Rejection, dated Aug. 25, 2015, issued in corresponding JP Application No. 2012-149390, 24 pages in English and Japanese.

Communication dated Sep. 19, 2016, from the Korean Intellectual Property Office in counterpart Korean application No. 10-2016-7016301.

Communication dated Sep. 1, 2016 from the State Intellectual Property Office of the P.R.C., in counterpart Chinese application No. 201380034406.5.

Notification of Decision of Rejection, dated Apr. 17, 2016, issued in corresponding KR Application No. 10-2014-7035774, 17 pages in English and Korean.

* cited by examiner

TRANSPARENT LAMINATE, CAPACITANCE TYPE INPUT DEVICE, AND IMAGE DISPLAY DEVICE

This is a continuation-in-part of application Ser. No. 14/585,298 filed Dec. 30, 2014, which is a continuation of PCT/JP2013/066482, filed Jun. 14, 2013, which claims priority to JP Application No. 2012-149390, filed Jul. 3, 2012, the contents of all of which are incorporated herein by reference in their entirety.

BACKGROUND OF THE INVENTION

1. Field of the Invention

The present invention relates to a transparent laminate, a capacitance type input device, and an image display device, and specifically, to a capacitance type input device capable of detecting a contact position of a finger as a change in capacitance, a transparent laminate capable of being used therein, and an image display device provided with the capacitance type input device as a constituent element.

2. Description of the Related Art

In recent years, in electronic devices such as cell phones, car navigations, personal computers, ticket-vending machines, and banking terminals, a tablet input device has been placed on a surface of a liquid crystal device or the like to touch a place where an instruction image is displayed with a finger or a touch pen with reference to the instruction image displayed in an image display region of the liquid crystal device and to thus input information corresponding to the instruction image.

Such an input device (touch panel) is either a resistive type or a capacitance type. However, since a resistive type input device has a two-sheet structure of a film and glass in which a short circuit is caused by pressing down the film, the resistive type input device has disadvantages in that an operation temperature range thereof is narrow and it has a low tolerance for a variation over time.

A capacitance type input device has an advantage in that a translucent conductive film may be simply formed on a single substrate. Such a capacitance type input device includes, for example, an input device of a type in which electrode patterns extend in directions crossing each other and a change in capacitance between the electrodes when contact is made by a finger or the like is detected so as to detect an input position (for example, see JP2010-86684A, JP2010-152809A, and JP2010-257492A).

Using the capacitance type input device has a problem in visibility such as a poor appearance due to a conspicuous transparent electrode pattern at a position slightly separated from the vicinity of a position where regular reflection occurs when being lighted by a light source. JP2010-86684A describes that an ITO pattern is formed on a substrate, and a layer made of a low refractive index dielectric material such as $SiO_2$ and a layer of a high refractive index dielectric material such as $Nb_2O_5$ are alternately laminated only on an upper side of the ITO pattern to make the transparent electrode pattern stealth and to attain neutral color tone using an optical interference effect of the layers.

JP2010-152809A describes that before formation of an ITO pattern on a substrate, a low refractive index layer made of $SiO_2$ or the like and a high refractive index layer made of $Nb_2O_5$ or the like are laminated only on a lower side of the ITO pattern, and then the ITO pattern is formed to prevent a shape of the transparent electrode pattern from appearing.

JP2010-257492A describes that before formation of an ITO pattern on a substrate, a low refractive index layer made of $SiO_2$ or the like and a high refractive index layer made of $Nb_2O_5$ or the like are laminated only on a lower side of the ITO pattern, and then the ITO pattern is formed to make the transparent electrode pattern or a crossing portion between the patterns inconspicuous.

SUMMARY OF THE INVENTION

The inventors of the invention have conducted studies on the layer configuration described in JP2010-86684A, JP2010-152809A, and JP2010-257492A, and found that the transparent electrode pattern is visually recognized, and the problem in which the transparent electrode pattern is visually recognized still cannot be completely solved.

An object of the invention is to provide a transparent laminate which does not have a problem in which a transparent electrode pattern is visually recognized.

The inventors of the invention have found that the problem in which the transparent electrode pattern is visually recognized can be solved by employing a configuration in which the transparent electrode pattern is interposed using two transparent films of a specific film thickness containing a metal oxide having a specific composition, or two transparent films having a specific refractive index and a specific film thickness.

The invention which is specific means for realizing the above-described object is as follows.

<1> A transparent laminate in which a region where a transparent substrate, a first transparent film which contains a metal oxide and has a film thickness of 55 nm to 110 nm, a transparent electrode pattern; and a second transparent film which contains 5 mass % to 80 mass % of metal oxide particles and has a film thickness of 55 nm to 110 nm are laminated in this order is included in a plane.

<2> A transparent laminate in which a region where a transparent substrate, a first transparent film which has a refractive index of 1.6 to 1.78 and a film thickness of 55 nm to 110 nm, a transparent electrode pattern, and a second transparent film which contains 5 mass % to 80 mass % of metal oxide particles and has a film thickness of 55 nm to 110 nm are laminated in this order is included in a plane.

<3> In the transparent laminate according to <1> or <2>, the first transparent film preferably contains 5 mass % to 80 mass % of metal oxide particles as the metal oxide.

<4> In the transparent laminate according to any one of <1> to <3>, the metal oxide particles preferably contain at least one of a titanium oxide, a titanium composite oxide, a zinc oxide, a zirconium oxide, an indium tin oxide, and an antimony tin oxide.

<5> In the transparent laminate according to any one of <1> to <4>, the metal oxide particles preferably has a refractive index of 1.9 or higher.

<6> In the transparent laminate according to any one of <1> to <5>, the metal oxide particles are preferably zirconium oxide particles, and the second transparent film preferably contains the metal oxide particles in an amount of 40.0 mass % to 80 mass %.

<7> In the transparent laminate according to any one of <1> to <6>, the metal oxide particles are preferably zirconium oxide particles, and the second transparent film preferably contains the metal oxide particles in an amount of 40.0 mass % to 70 mass %.

<8> In the transparent laminate according to any one of <1> to <7>, the metal oxide particles are preferably titanium oxide particles, and the second transparent film preferably contains the metal oxide particles in an amount of 30 mass % to 70 mass %

<9> In the transparent laminate according to any one of <1> to <8>, the second transparent film is preferably a resin film.

<10> In the transparent laminate according to <9>, the second transparent film which is the resin film preferably contains an acrylic resin.

<11> In the transparent laminate according to any one of <1> to <10>, both of the transparent electrode pattern and a non-pattern region where the transparent electrode pattern is not formed are preferably continuously covered with the first transparent film and the second transparent film directly or via another layer.

<12> In the transparent laminate according to any one of <1> to <11>, the first transparent film and the transparent electrode pattern are preferably adjacent to each other.

<13> In the transparent laminate according to any one of <1> to <12>, the transparent electrode pattern and the second transparent film are preferably adjacent to each other.

<14> In the transparent laminate according to any one of <1> to <13>, at least a part of the non-pattern region where the transparent electrode pattern is not formed preferably includes a region where the transparent substrate, the first transparent film, and the second transparent film are laminated in this order in a plane.

<15> In the transparent laminate according to <14>, the first transparent film and the second transparent film are preferably adjacent to each other in the region where the transparent substrate, the first transparent film, and the second transparent film are laminated in this order.

<16> In the transparent laminate according to any one of <1> to <15>, the first transparent film and the second transparent film are preferably made of the same material.

<17> In the transparent laminate according to any one of <1> to <16>, the transparent substrate is preferably a glass substrate or a film substrate having a refractive index of 1.5 to 1.55.

<18> In the transparent laminate according to any one of <1> to <17>, at least one of the first transparent film and the second transparent film is preferably a transparent resin film.

<19> In the transparent laminate according to any one of <1> to <18>, at least one of the first transparent film and the second transparent film is preferably formed by transferring a transparent curable resin film formed on a temporary support onto the transparent substrate.

<20> In the transparent laminate according to any one of <1> to <19>, the first transparent film is preferably formed by sputtering.

<21> In the transparent laminate according to any one of <1> to <20>, the first transparent film is preferably a mixed film of $SiO_2$ and $Nb_2O_5$ formed by sputtering.

<21-1> In the transparent laminate according to any one of <1> to <21>, a transparent protective film having a refractive index of 1.5 to 1.55 is preferably further formed on a surface of the second transparent film opposite a surface on which the transparent electrode pattern is formed.

<21-2> In the transparent laminate according to any one of <1> to <21> and <21-1>, the transparent electrode pattern is preferably an ITO film having a refractive index of 1.75 to 2.1.

<21-3> In the transparent laminate according to any one of <1> to <21>, <21-1>, and <21-2>, an end portion of the transparent electrode pattern preferably has a tapered shape having an angle of 30° or smaller.

<21-4> In the transparent laminate according to any one of <1> to <21>, <21-1>, <21-2>, and <21-3>, a third transparent film having a refractive index of 1.5 to 1.52 is preferably included between the transparent substrate and the first transparent film.

<22> A capacitance type input device including the transparent laminate according to any one of <1> to <21>, <21-1>, <21-2>, <21-3>, and <21-4>.

<23> An image display device including the capacitance type input device according to <22> as a constituent element.

The following configurations are also preferred aspects of the invention.

[1] A transparent laminate, in which a region where a transparent substrate, a first transparent film which has a refractive index of 1.6 to 1.78 and a film thickness of 55 nm to 110 nm, a transparent electrode pattern, and a second transparent film which has a refractive index of 1.6 to 1.78 and a film thickness of 55 nm to 110 nm are laminated in this order is included in a plane.

[2] In the transparent laminate according to [1], both of the transparent electrode pattern and a non-pattern region where the transparent electrode pattern is not formed are preferably continuously covered with the first transparent film and the second transparent film directly or via another layer.

[3] In the transparent laminate according to [1] or [2], the first transparent film and the transparent electrode pattern are preferably adjacent to each other.

[4] In the transparent laminate according to any one of [1] to [3], the transparent electrode pattern and the second transparent film are preferably adjacent to each other.

[5] In the transparent laminate according to any one of [1] to [4], at least a part of the non-pattern region where the transparent electrode pattern is not formed preferably includes a region where the transparent substrate, the first transparent film, and the second transparent film are laminated in this order in a plane.

[6] In the transparent laminate according to [5], the first transparent film and the second transparent film are preferably adjacent to each other in the region where the transparent substrate, the first transparent film, and the second transparent film are laminated in this order.

[7] In the transparent laminate according to any one of [1] to [6], a transparent protective film having a refractive index of 1.5 to 1.55 is preferably further formed on a surface of the second transparent film opposite a surface on which the transparent electrode pattern is formed.

[8] In the transparent laminate according to any one of [1] to [7], the first transparent film and the second transparent film are preferably made of the same material.

[9] In the transparent laminate according to any one of [1] to [8], the transparent substrate is preferably a glass substrate having a refractive index of 1.5 to 1.55.

[10] In the transparent laminate according to any one of [1] to [9], the transparent electrode pattern is preferably an ITO film having a refractive index of 1.75 to 2.1.

[11] In the transparent laminate according to any one of [I] to [10], at least one of the first transparent film and the second transparent film is preferably a transparent resin film.

[12] In the transparent laminate according to [11], the transparent resin film preferably has at least one of $ZrO_2$ particles and $TiO_2$ particles.

[13] In the transparent laminate according to any one of [1] to [12], at least one of the first transparent film and the second transparent film is preferably formed by transferring a transparent curable resin film formed on a temporary support onto the transparent substrate.

[14] In the transparent laminate according to any one of [1] to [12], at least one of the first transparent film and the second transparent film is preferably formed by sputtering.

[15] In the transparent laminate according to any one of [1] to [10], at least one of the first transparent film and the second transparent film is preferably a mixed film of $SiO_2$ and $Nb_2O_5$ formed by sputtering.

[16] In the transparent laminate according to any one of [1] to [15], an end portion of the transparent electrode pattern preferably has a tapered shape having an angle of 30° or smaller.

[17] In the transparent laminate according to any one of [1] to [16], a third transparent film having a refractive index of 1.5 to 1.52 is preferably included between the transparent substrate and the first transparent film.

[18] A capacitance type input device including the transparent laminate according to any one of [1] to [17].

[19] An image display device including the capacitance type input device according to [18] as a constituent element.

According to the invention, it is possible to provide a transparent laminate which does not have a problem in which a transparent electrode pattern is visually recognized.

DESCRIPTION OF THE PREFERRED EMBODIMENTS

Hereinafter, a transparent laminate, a capacitance type input device, and an image display device of the invention will be described. Constituent elements to be described below will be described based on representative embodiments and specific examples of the invention. However, the invention is not limited to such embodiments and specific examples. In this specification, the numerical value range expressed using the symbol "~" means a range including the numerical values described before and after the symbol "~" as a lower limit value and an upper limit value.

[Transparent Laminate]

A first aspect of a transparent laminate of the invention includes, in a plane thereof, a region where a transparent substrate, a first transparent film which contains a metal oxide and has a film thickness of 55 nm to 110 nm, a transparent electrode pattern; and a second transparent film which contains 5 mass % to 80 mass % of metal oxide particles and has a film thickness of 55 nm to 110 nm are laminated in this order.

A second aspect of the transparent laminate of the invention includes, in a plane thereof, a region where a transparent substrate, a first transparent film which has a refractive index of 1.6 to 1.78 and a film thickness of 55 nm to 110 nm, a transparent electrode pattern, and a second transparent film which contains 5 mass % to 80 mass % of metal oxide particles and has a film thickness of 55 nm to 110 nm are laminated in this order.

By virtue of such a configuration, a problem in which the transparent electrode pattern is visually recognized is solved, and thus a transparent laminate having a good appearance is obtained.

<Configuration of Transparent Laminate>

Figure 11:
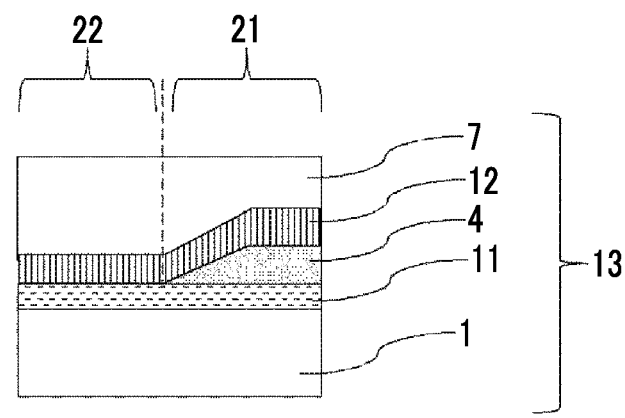
FIG. 11 is a schematic cross-sectional view showing an example of a configuration of a transparent laminate of the invention.

FIG. 11 shows an example of a configuration of the transparent laminate of the invention.

In FIG. 11, a region 21 where a transparent substrate 1, a first transparent film 11 having a film thickness of 55 nm to 110 nm, a transparent electrode pattern 4, and a second transparent film 12 having a film thickness of 55 nm to 110 nm are laminated in this order is provided in a plane.

"In a plane" means a direction substantially parallel to a plane parallel to the transparent substrate of the transparent laminate. " . . . includes, in a plane thereof, a region where a transparent substrate, a first transparent film, a transparent electrode pattern, and a second transparent film are laminated in this order" means that orthogonal projection on a plane of the transparent laminate parallel to the transparent substrate with respect to the region where the transparent substrate, the first transparent film, the transparent electrode pattern, and the second transparent film are laminated in this order exists in the plane parallel to the transparent substrate of the transparent laminate.

Figure 3:
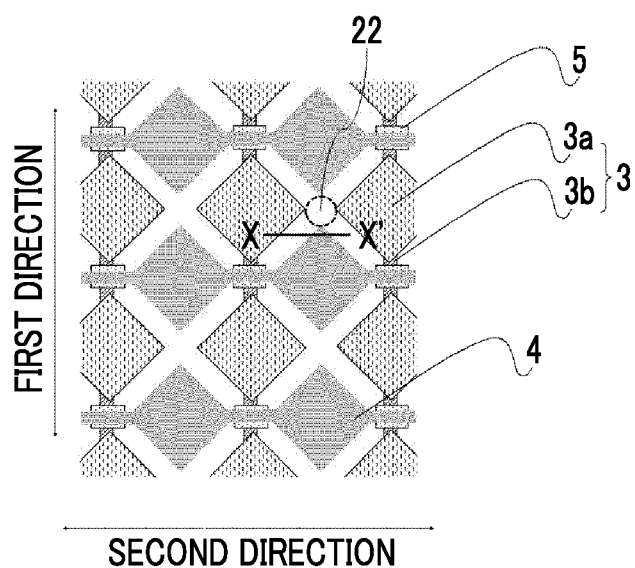
FIG. 3 is an explanatory diagram showing an example of a relationship between a transparent electrode pattern and a non-pattern region of the invention.

Here, when the transparent laminate of the invention is used in a capacitance type input device to be described later, the transparent electrode pattern may be provided as a first transparent electrode pattern and a second transparent electrode pattern in two directions, i.e., a row direction and a column direction, substantially perpendicular to each other (for example, see FIG. 3). For example, in the configuration of FIG. 3, the transparent electrode pattern of the transparent laminate of the invention may be a second transparent electrode pattern 4 or a pad portion 3a of a first transparent electrode pattern 3. In other words, in the following description of the transparent laminate of the invention, the transparent electrode pattern may be represented by the reference number "4", but the transparent electrode pattern in the transparent laminate of the invention is not limited to the use as the second transparent electrode pattern 4 in the capacitance type input device of the invention. For example, it may be used as the pad portion 3a of the first transparent electrode pattern 3.

The transparent laminate of the invention preferably includes a non-pattern region where no transparent electrode pattern is formed. In this specification, the "non-pattern region" means a region where the transparent electrode pattern 4 is not formed.

FIG. 11 shows an aspect in which the transparent laminate of the invention includes a non-pattern region 22.

The transparent laminate of the invention preferably includes, in a plane thereof, a region where the transparent substrate, the first transparent film, and the second transparent film are laminated in this order on at least a part of the non-pattern region 22 where no transparent electrode pattern is formed.

In the transparent laminate of the invention, the first transparent film and the second transparent film are preferably adjacent to each other in the region where the transparent substrate, the first transparent film, and the second transparent film are laminated in this order.

Another member may be placed at an arbitrary position in another region of the non-pattern region 22 as long as the gist of the invention is maintained. For example, when the transparent laminate of the invention is used in the capacitance type input device to be described later, a mask layer 2, an insulating layer 5, a conductive element 6, and the like in FIG. 1A can be laminated.

In the transparent laminate of the invention, the transparent substrate and the first transparent film are preferably adjacent to each other.

FIG. 11 shows an aspect in which the first transparent film 11 is adjacently laminated on the transparent substrate 1.

A third transparent film may be laminated between the transparent substrate and the first transparent film as long as the gist of the invention is maintained. For example, from the viewpoint of making it difficult to visually recognize the transparent electrode pattern, the transparent laminate of the invention preferably includes a third transparent film (not shown in FIG. 11) having a refractive index of 1.5 to 1.52 between the transparent substrate and the first transparent film.

In the transparent laminate of the invention, the thickness of the first transparent film is 55 nm to 110 nm, preferably 60 nm to 110 nm, and more preferably 70 nm to 90 nm from the viewpoint of making it difficult to visually recognize the transparent electrode pattern.

Here, the first transparent film may have a single layer structure or a laminate structure of two or more layers. When the first transparent film has a laminate structure of two or more layers, the "film thickness of the first transparent film" means a total film thickness of all of the layers.

In the transparent laminate of the invention, the first transparent film and the transparent electrode pattern are preferably adjacent to each other from the viewpoint of making it difficult to visually recognize the transparent electrode pattern.

FIG. 11 shows an aspect in which the transparent electrode pattern 4 is adjacently laminated on a region of a part of the first transparent film 11.

The shape of an end portion of the transparent electrode pattern 4 is not particularly limited, but as shown in FIG. 11, the end portion may have a tapered shape. For example, the end portion may have a tapered shape in which a surface on the transparent substrate side is wider than a surface on the side opposite to the transparent substrate.

Here, the angle of the end portion of the transparent electrode pattern when the end portion of the transparent electrode pattern has a tapered shape (hereinafter, also referred to as a taper angle) is preferably 30° or smaller, more preferably 0.1° to 15°, and especially preferably 0.5°
to 5° from the viewpoint of making it difficult to visually recognize the transparent electrode pattern.

In this specification, a method of measuring a taper angle includes taking a microphotograph of the end portion of the transparent electrode pattern; approximating the tapered portion in the microphotograph to a triangular shape; and directly measuring a taper angle.

Figure 10:
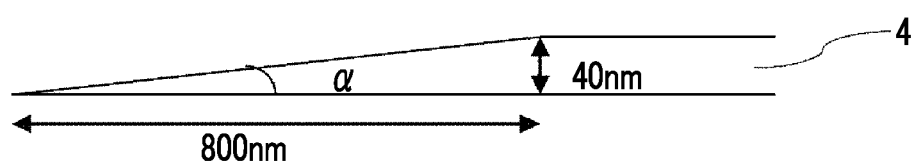
FIG. 10 is an explanatory diagram showing an example of a tapered shape of an end portion of the transparent electrode pattern.

FIG. 10 shows an example of the case in which the end portion of the transparent electrode pattern has a tapered shape. The triangular shape to which the tapered portion is approximated in FIG. 10 has an 80 nm-bottom surface and a height (a film thickness of an upper bottom portion substantially parallel to the bottom surface) of 40 nm, and at this time, a taper angle α is approximately 3°. The bottom surface of the triangular shape to which the tapered portion is approximated is preferably 10 nm to 3000 nm, more preferably 100 nm to 1500 nm, and especially preferably 300 nm to 1000 nm from the viewpoint of making it difficult to visually recognize the transparent electrode pattern. The preferred range of the height of the triangular shape to which the tapered portion is approximated is the same as the preferred range of the film thickness of the transparent electrode pattern.

The transparent laminate of the invention preferably includes, in the plane thereof, a region where the transparent electrode pattern and the second transparent film are adjacent to each other.

FIG. 11 shows an aspect in which the transparent electrode pattern and the second transparent film are adjacent to each other in the region 21 where the transparent substrate, the first transparent film, the transparent electrode pattern, and the second transparent film are laminated in this order.

In the transparent laminate of the invention, both of the transparent electrode pattern and the non-pattern region 22 where no transparent electrode pattern is formed are preferably continuously covered with the first transparent film and the second transparent film directly or via another layer.

Here, "continuously" means that the first transparent film and the second transparent film are not pattern films, but continuous films. That is, the first transparent film and the second transparent film preferably have no opening portion from the viewpoint of making it difficult to visually recognize the transparent electrode pattern.

In addition, the transparent electrode pattern and the non-pattern region 22 are preferably directly covered with the first transparent film and the second transparent film, rather than via another layer. Examples of "another layer" for the case in which the transparent electrode pattern and the non-pattern region 22 are covered via another layer include the insulating layer 5 included in the capacitance type input device of the invention to be described later, and a transparent electrode pattern which is a second layer when two or more transparent electrode patterns are included as in the capacitance type input device of the invention to be described later.

FIG. 11 shows an aspect in which the second transparent film 12 is laminated over and adjacent to the region where the transparent electrode pattern 4 on the first transparent film 11 is not laminated and the transparent electrode pattern 4.

When the end portion of the transparent electrode pattern 4 has a tapered shape, the second transparent film 12 is preferably laminated along the tapered shape (at the same slope as the taper angle).

In the transparent laminate of the invention, the thickness of the second transparent film is 55 nm to 110 nm, preferably 60 nm to 110 nm, and more preferably 70 nm to 90 nm from the viewpoint of making it difficult to visually recognize the transparent electrode pattern.

Here, the second transparent film may have a single layer structure or a laminate structure of two or more layers. When the second transparent film has a laminate structure of two or more layers, the "film thickness of the first transparent film" means a total film thickness of all of the layers.

In the transparent laminate of the invention, a transparent protective film having a refractive index of 1.5 to 1.55 is preferably further formed on a surface on the side of the second transparent film opposite the surface having the transparent electrode pattern formed thereon. The transparent protective film 7 is preferably also formed on the surface of the second transparent film of the non-pattern region.

FIG. 11 shows an aspect in which the transparent protective film 7 is laminated on the surface on the side of the second transparent film 12 opposite the surface having the transparent electrode pattern formed thereon.

In the transparent laminate of the invention, the thickness of the transparent protective film is preferably 0.1 μm to 10 μm, more preferably 0.5 μm to 5 μm, and especially preferably 1 μm to 3 μm.

<Material of Transparent Laminate>
(Transparent Substrate)

In the transparent laminate of the invention, the transparent substrate is preferably a glass substrate or a film substrate having a refractive index of 1.5 to 1.55 from the viewpoint of making it difficult to visually recognize the transparent electrode pattern. The refractive index of the transparent substrate is especially preferably 1.5 to 1.52.

The transparent substrate is formed of a translucent substrate such as a glass substrate, and tempered glass represented by Gorilla Glass of Corning Inc. can be used. For the transparent substrate, a material used in JP2010-86684A, JP2010-152809A, and JP2010-257492A can be preferably used, and the contents of these literatures are incorporated herein.

As the film substrate, a film substrate having no optical distortion or high transparency is preferably used. Examples of its specific material include polyethylene terephthalate (PET), polyethylene naphthalate, polycarbonate (PC), triacetylcellulose (TAC), and cycloolefin polymer (COP).

(First Transparent Film)

In the first aspect of the transparent laminate of the invention, a first transparent film which contains a metal oxide and has a film thickness of 55 nm to 110 nm is provided. In the first aspect of the transparent laminate of the invention, the first transparent film preferably contains 5 mass % to 80 mass % of metal oxide particles as the metal oxide. In the first aspect of the transparent laminate of the invention, the refractive index of the first transparent film is preferably 1.6 to 1.78, and more preferably 1.65 to 1.74 from the viewpoint of making it difficult to visually recognize the transparent electrode pattern.

In the second aspect of the transparent laminate of the invention, a first transparent film which has a refractive index of 1.6 to 1.78 and a film thickness of 55 nm to 110 nm is provided. In the second aspect of the transparent laminate of the invention, the refractive index of the first transparent film is preferably 1.6 to 1.78, and more preferably 1.65 to 1.74 from the viewpoint of making it difficult to visually recognize the transparent electrode pattern.

Here, the first transparent film or the second transparent film may have a single layer structure or a laminate structure of two or more layers. When the first transparent film or the second transparent film has a laminate structure of two or more layers, the refractive index of the first transparent film or the second transparent film means a refractive index of all of the layers.

The material of the first transparent film is not particularly limited as long as such a refractive index range is satisfied.

(1) Transparent Resin Film

In the transparent laminate of the invention, at least one of the first transparent film and the second transparent film is preferably a transparent resin film. In the transparent laminate of the invention, the second transparent film is more preferably a resin film.

The method of controlling the refractive index of the transparent resin film is not particularly limited. A transparent resin film having a desired refractive index can be separately used, or a transparent resin film containing metal oxide particles or fine particles such as metal fine particles and metal oxide fine particles added thereto can be used.

A resin composition used for the transparent resin film preferably contains metal oxide particles for the purpose of adjusting the refractive index and optical transparency. Since the metal oxide particles have high transparency and optical transparency, a positive photosensitive resin composition having a high refractive index and excellent transparency is obtained.

The metal oxide particles preferably have a higher refractive index than a refractive index of a resin composition formed of a material which does not contain the particles. Specifically, the particles preferably have a refractive index of 1.50 or higher, more preferably 1.70 or higher, especially preferably 1.90 or higher, and more especially preferably 2.00 or higher with respect to light rays having a wavelength of 400 nm to 750 nm.

Here, " . . . have a refractive index of 1.50 or higher with respect to light rays having a wavelength of 400 nm to 750 nm" means that an average refractive index with respect to light rays having a wavelength in the above-described range is 1.50 or higher. The refractive indices with respect to all of the light rays having a wavelength in the above-described range are not necessarily 1.50 or higher. The average refractive index is a value obtained by dividing the sum of measured refractive index values with respect to the respective light rays having a wavelength in the above-described range by the number of measurement points.

The metal of the metal oxide particles also includes a semimetal such as B, Si, Ge, As, Sb, or Te.

The metal oxide particles having optical transparency and a high refractive index are preferably oxide particles containing an atom such as Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi or Te, more preferably a titanium oxide, a titanium composite oxide, a zinc oxide, a zirconium oxide, an indium tin oxide, or an antimony tin oxide, even more preferably a titanium oxide, a titanium composite oxide, or a zirconium oxide, and especially preferably a titanium oxide or a zirconium oxide. A titanium dioxide is preferably a rutile type having a particularly high refractive index. These metal oxide particles can also be surface-treated with an organic material to impart dispersion stability.

The average primary particle diameter of the metal oxide particles is preferably 1 nm to 200 nm, and especially preferably 3 nm to 80 nm from the viewpoint of the transparency of the resin composition. Here, the average primary particle diameter of the particles is an arithmetic average of particle diameters of arbitrary 200 particles measured using an electron microscope. When the particles do not have a spherical shape, the longest side is set as a diameter.

The metal oxide particles may be used singly or in combination of two or more kinds.

The content of the metal oxide particles in the resin composition may be appropriately determined in consideration of the refractive index and optical transparency required for an optical member to be obtained using the resin composition. The content is preferably 5 mass % to 80 mass %, more preferably 5 mass % to 80 mass %, especially preferably 5 mass % to 70 mass %, and more especially preferably 10 mass % to 70 mass % with respect to the entire solid content of the resin composition.

In the transparent laminate of the invention, the transparent resin film preferably has at least one of $ZrO_2$ particles and $TiO_2$ particles from the viewpoint of controlling the refractive index within the refractive index ranges of the first transparent film and the second transparent film. When the metal oxide particles are zirconium oxide particles, the first transparent film or the second transparent film contains the metal oxide particles preferably in an amount of 40.0 mass % to 80 mass %, more preferably 40.0 mass % to 70 mass %, especially preferably 40.0 mass % to 69.8 mass %, more especially preferably greater than 40.0 mass % to 69.8 mass %, even more especially preferably 50.0 mass % to 65.0 mass %, and most preferably 60.0 mass % to 65.0 mass %. When the metal oxide particles are titanium oxide particles, the first transparent film or the second transparent film preferably contains the metal oxide particles in an amount of 30 mass % to 70 mass %.

The method of measuring the content of the metal oxide particles of the first transparent film or the second transparent film in the transparent laminate of the invention is as follows.

A cross-section of the transparent laminate is cut, and then observed using a transmission electron microscope (TEM). A proportion of the area occupied by the metal oxide particles in the cross-sectional area of the first transparent film and the second transparent film is measured at arbitrary three points in the layer, and an average thereof is regarded as a volume fraction (VR).

The volume fraction (VR) and a weight fraction (WR) are converted by the following expression, and thus the weight fraction (WR) of the metal oxide particles in the first transparent film and the second transparent film is calculated.

$$WR=1/(1.1*(1/(D*VR)-1)+1)$$

D: Specific gravity of metal oxide particles

When the metal oxide particles are titanium oxide particles, D is 4.0, and when the metal oxide particles are zirconium oxide particles, D is 6.0 for calculation.

The resin (binder) and other additives used for the transparent resin film are not particularly limited as long as the gist of the invention is maintained. A resin and other additives to be used for a photosensitive resin layer of a photosensitive film to be used when manufacturing the capacitance type input device of the invention to be described later can be preferably used.

In the transparent laminate of the invention, the second transparent film which is the resin film preferably contains an acrylic resin.

(2) Inorganic Film

In the transparent laminate of the invention, the first transparent film may be an inorganic film.

As the inorganic film, an inorganic film used in JP2010-86684A, JP2010-152809A, and JP2010-257492A can be used. An inorganic film having a laminate structure of a low refractive index material and a high refractive index material described in these literatures, or an inorganic film as a mixed film of a low refractive index material and a high refractive index material is preferably used from the viewpoint of controlling the refractive index. As the low refractive index material and the high refractive index material, materials used in the above-described JP2010-86684A, JP2010-152809A, and JP2010-257492A can be preferably used, and the contents of these literatures are incorporated herein.

In the transparent laminate of the invention, the first transparent film is preferably a mixed film of $SiO_2$ and $Nb_2O_5$, and more preferably a mixed film of $SiO_2$ and $Nb_2O_5$ formed through sputtering.

(Transparent Electrode Pattern)

The refractive index of the transparent electrode pattern is preferably 1.75 to 2.1.

The material of the transparent electrode pattern is not particularly limited, and a known material can be used. For example, it can be produced using a translucent conductive metal oxide film such as an indium tin oxide (ITO) or an indium zinc oxide (IZO). Examples of such a metal film include ITO films; metal films such as Al, Zn, Cu, Fe, Ni, Cr, and Mo; and metal oxide films such as $SiO_2$. In this case, the film thickness of each element can be set to 10 nm to 200 nm. In addition, since an amorphous ITO film is turned into a polycrystalline ITO film through baking, electrical resistance can also be reduced. The first transparent electrode pattern 3, the second transparent electrode pattern 4, and the conductive element 6 to be described later can also be manufactured using a photosensitive film having a photocurable resin layer using conductive fibers. When the first conductive pattern or the like is formed using ITO or the like, it is possible to refer to the paragraphs [0014] to [0016] of JP4506785B. The transparent electrode pattern is preferably an ITO film.

In the transparent laminate of the invention, the transparent electrode pattern is preferably an ITO film having a refractive index of 1.75 to 2.1.

(Second Transparent Film)

In the transparent laminate of the invention, the second transparent film contains the metal oxide particles in an amount of 5 mass % to 88.7 mass %.

The preferred ranges of the material and the physical properties such as the refractive index of the second transparent film are the same as the preferred ranges of those of the first transparent film.

In the transparent laminate of the invention, the first transparent film and the second transparent film are preferably made of the same material from the viewpoint of optical homogeneity.

(Transparent Protective Film)

The refractive index of the transparent protective film is preferably 1.5 to 1.55, and more preferably 1.5 to 1.52.

The material of the transparent protective film preferably has high surface hardness and high heat resistance, and a known photosensitive siloxane resin material, acrylic resin material or the like is used.

(Third Transparent Film)

The refractive index of the third transparent film is preferably 1.5 to 1.55, and more preferably 1.5 to 1.52 from the viewpoint that it is brought closer to the refractive index of the transparent substrate and the visibility of the transparent electrode pattern is improved.

<Method of Manufacturing Transparent Laminate>
(Formation of First Transparent Film and Second Transparent Film)

The first transparent film is formed on the transparent electrode directly or via another layer such as the third transparent film.

The second transparent film is formed on the transparent electrode pattern and on the first transparent film in the non-pattern region directly or via another layer.

The method of forming the first transparent film and the second transparent film is not particularly limited. These are preferably formed through transfer or sputtering.

In the transparent laminate of the invention, at least one of the first transparent film and the second transparent film is preferably formed by transfer, onto the transparent substrate, a transparent curable resin film formed on a temporary support, and more preferably formed by being subjected to curing after the transfer. Examples of the transfer and curing method include a method using the photosensitive film in the description of the capacitance type input device of the invention to be described later. In that case, the refractive index is preferably adjusted within the ranges of the first transparent film and the second transparent film by dispersing metal oxide particles in the photocurable resin layer in the photosensitive film.

When the first transparent film or the second transparent film is an inorganic film, the formation thereof is preferably performed through sputtering. That is, in the transparent laminate of the invention, at least one of the first transparent film and the second transparent film is preferably formed through sputtering.

A method used in JP2010-86684A, JP2010-152809A, and JP2010-257492A can be preferably used as the sputtering method, and the contents of these literatures are incorporated herein.

(Formation of Transparent Electrode Pattern)

The transparent electrode pattern can be formed on the first transparent film using a method of forming the first transparent electrode pattern 3, the second transparent electrode pattern 4, and the separate conductive element 6 in the description of the capacitance type input device of the invention to be described later, and a method using the photosensitive film is preferred.

[Capacitance Type Input Device]

The capacitance type input device of the invention is characterized in that it has the transparent laminate of the invention.

The capacitance type input device of the invention includes a transparent substrate (hereinafter, the transparent substrate in the transparent laminate of the invention will be also referred to as a front face plate or a base material), a first transparent film, a transparent electrode pattern, and a second transparent film.

The capacitance type input device preferably has the following elements (1) to (5) on a non-contact side of the front face plate.

The method of manufacturing the capacitance type input device of the invention is not limited, but at least one of the elements (1) to (5) is preferably formed using a photosensitive film having a temporary support and a photocurable resin layer in this order, and more preferably formed using a photosensitive film having a temporary support, a thermoplastic resin layer, and a photocurable resin layer in this order.

(1) A mask layer
(2) A plurality of first transparent electrode patterns in which a plurality of pad portions is formed to extend in a first direction via connection portions.
(3) A plurality of second transparent electrode patterns which is electrically insulated from the first transparent electrode patterns and is formed of a plurality of pad portions formed to extend in a direction crossing the first direction.
(4) An insulating layer which electrically insulates the first transparent electrode pattern and the second transparent electrode pattern from each other.
(5) A conductive element which is electrically connected to at least one of the first transparent electrode pattern and the second transparent electrode pattern and is a separate element from the first transparent electrode pattern and the second transparent electrode pattern.

In the capacitance type input device of the invention, a transparent protective layer is preferably further installed to cover some or all of the elements (1) to (5), and is more preferably the transparent protective layer of the transparent laminate of the invention.

If necessary, a decorative layer may be further provided for decoration between the mask layer and the transparent substrate (front face plate). For example, a white decorative layer is preferably provided.

Even when the capacitance type input device of the invention includes such various members, it is possible to make the transparent electrode pattern interposed between the first transparent film and the second transparent film inconspicuous, and thus the visibility can be improved.

<<Configuration of Capacitance Type Input Device and Method of Manufacturing Capacitance Type Input Device>>

<Configuration>

Figure 1A:
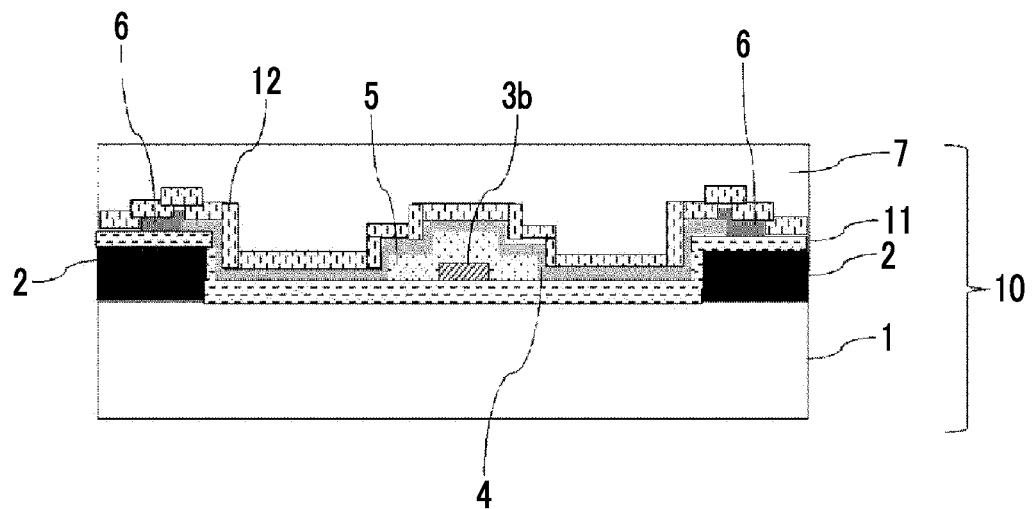
FIG. 1A is a schematic cross-sectional view showing an example of a configuration of a capacitance type input device of the invention.

First, a preferred configuration of the capacitance type input device of the invention will be described together with methods of manufacturing the members in the device. FIG. 1A is a cross-sectional view showing a preferred configuration of the capacitance type input device of the invention. FIG. 1A shows an aspect in which a capacitance type input device 10 is formed of a transparent substrate (front face plate) 1, a mask layer 2, a first transparent film 11, a first transparent electrode pattern 3, a second transparent electrode pattern 4, an insulating layer 5, a conductive element 6, a second transparent film 12, and a transparent protective layer 7.

Figure 1B:
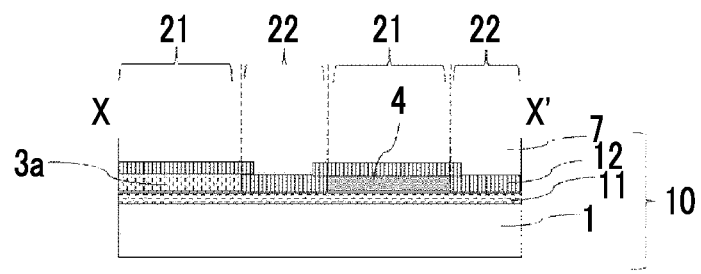
FIG. 1B is a schematic cross-sectional view showing another example of the configuration of the capacitance type input device of the invention.

Similarly, FIG. 1B showing a cross-section taken along the line X-X' of FIG. 3 to be described later is also a cross-sectional view showing a preferred configuration of the capacitance type input device of the invention. FIG. 1B shows an aspect in which a capacitance type input device 10 is formed of a transparent substrate (front face plate) 1, a first transparent film 11, a first transparent electrode pattern 3, a second transparent electrode pattern 4, a second transparent film 12, and a transparent protective layer 7.

For the transparent substrate (front face plate) 1, those exemplified as the material of the transparent electrode pattern in the transparent laminate of the invention can be used. In FIG. 1A, a side of the front face plate 1 on which the elements are provided will be referred to as a non-contact surface. In the capacitance type input device 10 of the invention, input is performed by bringing a finger or the like into contact with a contact surface (a surface opposite to the non-contact surface) of the front face plate 1.

The mask layer 2 is provided on the non-contact surface of the front face plate 1. The mask layer 2 is a frame-shaped pattern around a display region formed on the non-contact side of the front face plate of a touch panel, and is formed so that a drawing wire and the like are not seen.

Figure 2:
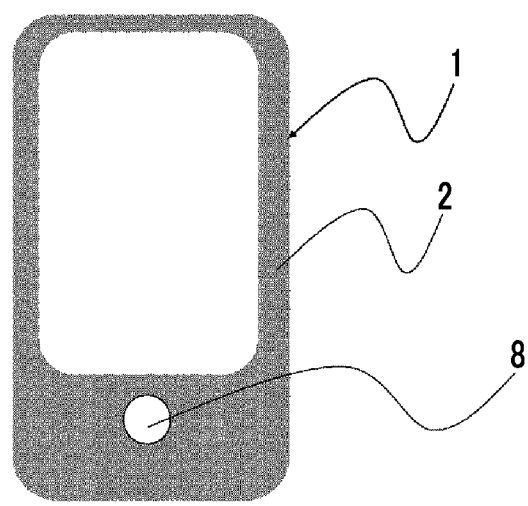
FIG. 2 is an explanatory diagram showing an example of a front face plate of the invention.

As shown in FIG. 2, in the capacitance type input device 10 of the invention, the mask layer 2 is provided to cover a region of a part of the front face plate 1 (a region other than the input surface in FIG. 2). As shown in FIG. 2, an opening portion 8 can be provided in a part of the front face plate 1. A mechanical switch which is operated by pressing can be installed in the opening portion 8.

On the contact surface of the front face plate 1, the plurality of first transparent electrode patterns 3 in which a plurality of pad portions is formed to extend in a first direction via connection portions, the plurality of second transparent electrode patterns 4 which is electrically insulated from the first transparent electrode patterns 3 and is formed of a plurality of pad portions formed to extend in a direction crossing the first direction, and the insulating layer 5 which electrically insulates the first transparent electrode pattern 3 and the second transparent electrode pattern 4 from each other are formed. For the first transparent electrode pattern 3, the second transparent electrode pattern 4, and the conductive element 6 to be described later, those exemplified as the material of the transparent electrode pattern in the transparent laminate of the invention can be used, and an ITO film is preferred.

At least one of the first transparent electrode pattern 3 and the second transparent electrode pattern 4 can be installed over both of regions of the non-contact surface of the front face plate 1 and the surface of the mask layer 2 opposite the front face plate 1. In FIG. 1A, the second transparent electrode pattern is installed over both of the regions of the non-contact surface of the front face plate 1 and the surface of the mask layer 2 opposite the front face plate 1. As described above, even when the photosensitive film is laminated over the mask layer required to have a constant thickness and the rear surface of the front face plate, a laminate having no bubbles generated in a boundary of the mask portion can be formed with a simple process using a photosensitive film having a specific layer configuration to be described later without the use of expensive facilities such as a vacuum laminator.

The first transparent electrode pattern 3 and the second transparent electrode pattern 4 will be described using FIG. 3. FIG. 3 is an explanatory diagram showing an example of the first transparent electrode pattern and the second transparent electrode pattern of the invention. As shown in FIG. 3, the first transparent electrode patterns 3 are formed so that pad portions 3a extend in the first direction via connection portions 3b. In addition, the second transparent electrode patterns 4 are electrically insulated from the first transparent electrode patterns 3 by the insulating layers 5, and are formed of a plurality of pad portions formed to extend in the direction crossing the first direction (second direction in FIG. 3). Here, when the first transparent electrode patterns 3 are formed, the pad portions 3a and the connection portions 3b may be produced integrally with each other. Otherwise, only the connection portions 3b may be produced and the pad portions 3a and the second transparent electrode patterns 4 may be produced integrally with each other (patterning). When the pad portions 3a and the second transparent electrode patterns 4 are produced integrally with each other (patterning), a part of the connection portion 3b and a part of the pad portion 3a are connected to each other as shown in FIG. 3, and the respective layers are formed so that the first transparent electrode pattern 3 and the second transparent electrode pattern 4 are electrically insulated from each other by the insulating layer 5.

A region where the first transparent electrode pattern 3 and the second transparent electrode pattern 4 of FIG. 3 and the conductive element 6 to be described later are not formed corresponds to the non-pattern region 22 in the transparent laminate of the invention.

In FIG. 1A, the conductive element 6 is installed on the side of the surface of the mask layer 2 opposite the front face plate 1. The conductive element 6 is electrically connected to at least one of the first transparent electrode pattern 3 and the second transparent electrode pattern 4, and is a separate element from the first transparent electrode pattern 3 and the second transparent electrode pattern 4. In FIG. 1A, the conductive element 6 is connected to the second transparent electrode pattern 4.

In addition, in FIG. 1A, the transparent protective layer 7 is installed to cover all of the constituent elements. The transparent protective layer 7 may be configured to cover only some of the constituent elements. The insulating layer 5 and the transparent protective layer 7 may be made of the same material, or different materials. Those exemplified as the material of the transparent protective layer in the transparent laminate of the invention can be preferably used as the materials of the insulating layer 5 and the transparent protective layer 7.

<Manufacturing Method>

In a manufacturing method of the invention, at least one of the mask layer 2, the first transparent electrode pattern 3, the second transparent electrode pattern 4, the insulating layer 5, the conductive element 6, and if necessary, the transparent protective layer 7 is preferably formed using a photosensitive film (hereinafter, also referred to as a photosensitive transfer material) having a temporary support and a photocurable resin layer in this order.

The mask layer 2, the insulating layer 5, and the transparent protective layer 7 can be formed by transferring a photocurable resin layer onto the front face plate 1 using a photosensitive film. For example, when the black mask layer 2 is formed, it can be formed by transferring, using a photosensitive film having a black photocurable resin layer as a photocurable resin layer, the black photocurable resin layer onto the surface of the front face plate 1. When the insulating layer 5 is formed, it can be formed by transferring, using a photosensitive film having an insulating photocurable resin layer as a photocurable resin layer, the photocurable resin layer onto the surface of the front face plate 1 having the first transparent electrode pattern formed thereon. When the transparent protective layer 7 is formed, it can be formed by transferring, using a photosensitive film having a transparent photocurable resin layer as a photocurable resin layer, the photocurable resin layer onto the surface of the front face plate 1 having the respective elements formed thereon.

When the mask layer 2 and the like are formed using a photosensitive film, a resist component does not leak from the opening portion even in the substrate (front face plate) having the opening portion, and particularly, the resist component does not protrude from a glass end in the mask layer required to have a light shielding pattern formed thereon up to the boundary of the front face plate, and thus a touch panel having merits such as a thin layer and a reduction in weight can be manufactured with a simple process without contamination on the rear side of the substrate.

Furthermore, using a photosensitive film having a specific layer configuration having a thermoplastic resin layer between a photocurable resin layer and a temporary support in the formation of the mask layer 2 required to have light shieldability, the generation of bubbles when laminating the photosensitive film can be prevented, and the mask layer 2 and the like having high quality without light leakage can be formed.

The first transparent electrode pattern 3, the second transparent electrode pattern 4, and the conductive element 6 can be formed through an etching process or using a photosensitive film having a conductive photocurable resin layer.

When the first transparent electrode pattern 3, the second transparent electrode pattern 4, and the separate conductive element 6 are formed through an etching process, first, a transparent electrode layer such as ITO is formed through sputtering on the non-contact surface of the front face plate 1 on which the mask layer 2 and the like are formed. Next, an etching pattern is formed through exposure and development using a photosensitive film having a photocurable resin layer for etching as a photocurable resin layer on the transparent electrode layer. Thereafter, the transparent electrode layer is subjected to etching for patterning of the transparent electrode, and the etching pattern is removed. Thus, the first transparent electrode pattern 3 and the like can be formed.

When the first transparent electrode pattern 3, the second transparent electrode pattern 4, and the separate conductive element 6 are formed using a photosensitive film having a conductive photocurable resin layer, these can be formed by transferring the conductive photocurable resin layer onto the surface of the front face plate 1.

When the first transparent electrode pattern 3 and the like are formed using a photosensitive film having a conductive photocurable resin layer, a resist component does not leak from the opening portion even in the substrate (front face plate) having the opening portion, and thus a touch panel having merits such as a thin layer and a reduction in weight can be manufactured with a simple process without contamination on the rear side of the substrate.

Furthermore, using a photosensitive film having a specific layer configuration having a thermoplastic resin layer between a conductive photocurable resin layer and a temporary support in the formation of the first transparent electrode pattern 3 and the like, bubbles can be prevented from being generated when laminating the photosensitive film, and the first transparent electrode pattern 3, the second transparent electrode pattern 4, and the separate conductive element 6 having excellent conductivity and small resistance can be formed.

Figure 4:
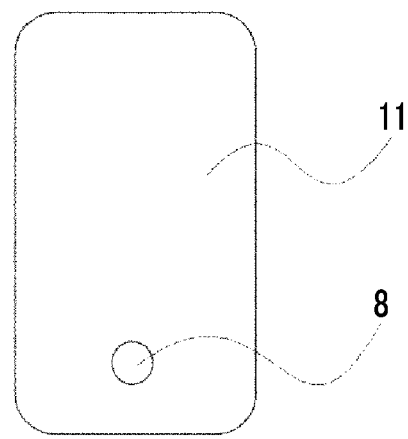
FIG. 4 is a top view showing an example of strengthened glass in which an opening portion is formed.
Figure 5:
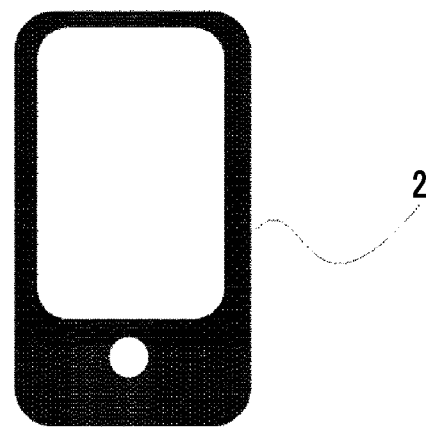
FIG. 5 is a top view showing an example of the front face plate on which a mask layer is formed.
Figure 6:
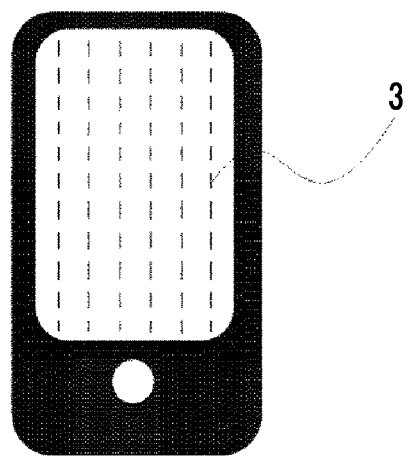
FIG. 6 is a top view showing an example of the front face plate on which a first transparent electrode pattern is formed.
Figure 7:
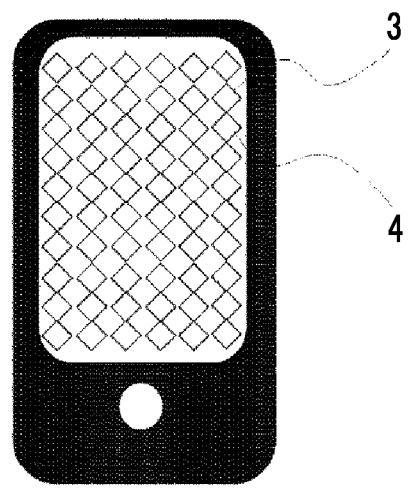
FIG. 7 is a top view showing an example of the front face plate on which first and second transparent electrode patterns are formed.
Figure 8:
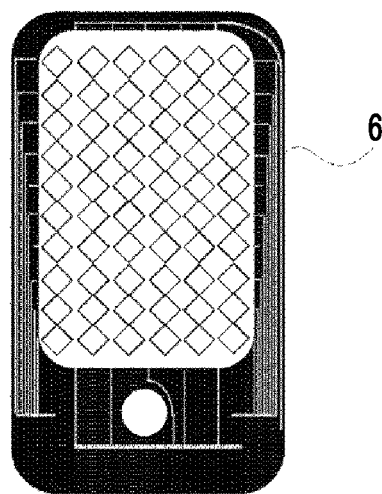
FIG. 8 is a top view showing an example of the front face plate on which a separate conductive element from the first and second transparent electrode patterns is formed.

The aspects of FIGS. 4 to 8 can be exemplified as examples of aspects formed during the course of manufacturing the capacitance type input device of the invention. FIG. 4 is a top view showing an example of strengthened glass 11 in which the opening portion 8 is formed. FIG. 5 is a top view showing an example of the front face plate on which the mask layer 2 is formed. FIG. 6 is a top view showing an example of the front face plate on which the first transparent electrode pattern 3 is formed. FIG. 7 is a top view showing an example of the front face plate on which the first transparent electrode pattern 3 and the second transparent electrode pattern 4 are formed. FIG. 8 is a top view showing an example of the front face plate on which the separate conductive element 6 from the first and second transparent electrode patterns is formed. These show specific examples of the above description, and the scope of the invention is not restrictively interpreted by these drawings.

<<Method of Manufacturing of Each Member Using Photosensitive Film>>

Next, the photosensitive film which is preferably used when the capacitance type input device of the invention is manufactured will be described. The photosensitive film has a temporary support and a photocurable resin layer, and preferably has a thermoplastic resin layer between the temporary support and the photocurable resin layer. When the mask layer and the like are formed using the photosensitive film having the thermoplastic resin layer, bubbles are rarely generated in the element formed by transferring the photocurable resin layer, image unevenness and the like rarely occur in an image display device, and thus excellent display characteristics can be obtained.

The photosensitive film may be a negative material or a positive material.

<Temporary Support>

A flexible material which is not significantly deformed, contracted or elongated under pressure or under pressure and heat can be used as the temporary support. Examples of such a support include a polyethylene terephthalate film, a cellulose triacetate film, a polystyrene film, and a polycarbonate film. Among these, a biaxially-stretched polyethylene terephthalate film is especially preferred.

The thickness of the temporary support is not particularly limited, and generally 5 µm to 200 µm. It is especially preferably 10 µm to 150 µm in view of easy handling, versatility and the like.

The temporary support may be transparent or may contain dyed silicon, alumina sol, chromium salt and zirconium salt, and the like.

Conductivity can be imparted to the temporary support using a method described in JP2005-221726A or the like.

<Thermoplastic Resin Layer>

The photosensitive film is preferably provided with a thermoplastic resin layer between the temporary support and the colored photosensitive resin layer. The thermoplastic resin layer preferably has alkali-solubility. The thermoplastic resin layer serves as a cushioning material to absorb irregularities (also including irregularities generated due to an image or the like formed already) on a surface of the base, and preferably has such a property as to be deformed according to the irregularities of the target surface.

The thermoplastic resin layer preferably contains an organic polymer substance described in JP1993-72724A (JP-H05-72724A) as a component, and especially preferably contains at least one selected from organic polymer substances whose softening point, measured by the Vicat method (specifically, a polymer softening point measurement method according to American Material Test Method ASTMD1235) is approximately 80° or lower.

Specific examples thereof include organic polymers such as polyolefin, e.g., polyethylene and polypropylene, an ethylene copolymer of ethylene and vinyl acetate or a saponified product thereof, a copolymer of ethylene and acrylic acid ester or a saponified product thereof, polyvinyl chloride, a vinyl chloride copolymer of vinyl chloride and vinyl acetate or a saponified product thereof, polyvinylidene chloride, a vinylidene chloride copolymer, polystyrene, a styrene copolymer of styrene and (meth)acrylic acid ester or a saponified product thereof, polyvinyl toluene, a vinyltoluene copolymer of vinyltoluene and (meth)acrylic acid ester or a saponified product thereof, poly(meth)acrylic acid ester, a (meth)acrylic acid ester copolymer of butyl(meth)acrylate and vinyl acetate, and a polyamide resin, e.g., a vinyl acetate copolymer nylon, a copolymerized nylon, N-alkoxymethylated nylon, and N-dimethylaminated nylon.

The layer thickness of the thermoplastic resin layer is preferably 3 µm to 30 µm. When the layer thickness of the thermoplastic resin layer is less than 3 µm, followability is insufficient upon the lamination, and thus the irregularities on the surface of the base may not be completely absorbed. When the layer thickness is greater than 30 µm, a load may be put on the drying (solvent removal) in the formation of the thermoplastic resin layer on the temporary support, a long period of time may be required for development of the thermoplastic resin layer, or process adaptability may be deteriorated. The layer thickness of the thermoplastic resin layer is more preferably 4 µm to 25 µm, and especially preferably 5 µm to 20 µm.

The thermoplastic resin layer can be formed by coating with a preparation containing a thermoplastic organic polymer, and the preparation used in the coating can be prepared using a solvent. The solvent is not particularly limited as long as it can dissolve the polymer component in the layer, and examples thereof include methyl ethyl ketone, cyclohexanone, propylene glycol monomethyl ether acetate, n-propanol, and 2-propanol.

<Photocurable Resin Layer>

An additive is added to the photocurable resin layer depending on the use of the photosensitive film. That is, when the photosensitive film is used to form the mask layer, a colorant is contained in the photocurable resin layer. When the photosensitive film has a conductive photocurable resin layer, conductive fibers or the like are contained in the photocurable resin layer.

When the photosensitive film is a negative material, the photocurable resin layer preferably contains an alkali-soluble resin, a polymerizable compound, a polymerization initiator, or a polymerization initiation system. Using the colorant, additive, and the like is not limited thereto.

Polymers described in the paragraph [0025] in JP2011-95716A and in the paragraphs [0033] to [0052] in JP2010-237589A can be used as the alkali-soluble resin contained in the photosensitive film.

A polymerizable compound described in the paragraphs [0023] and [0024] in JP4098550B can be used as the polymerizable compound.

A polymerizable compound described in the paragraphs [0031] to [0042] in JP2011-95716A can be used as the polymerization initiator or the polymerization initiation system.

(Conductive Photocurable Resin Layer (Conductive Fibers))

When a photosensitive film having a conductive photocurable resin layer laminated thereon is used to form a transparent electrode pattern or another conductive element, the following conductive fibers or the like can be used in the photocurable resin layer.

The structure of the conductive fibers is not particularly limited, and can be appropriately selected according to the purpose. Either a solid structure or a hollow structure is preferred.

Here, fibers having a solid structure may be referred to as "wires", and fibers having a hollow structure may be referred to as "tubes". In addition, conductive fibers having an average minor axis length of 5 nm to 1,000 nm and an average major axis length of 1 µm to 100 µm may be referred to as "nanowires".

Conductive fibers having a hollow structure with an average minor axis length of 1 nm to 1,000 nm and an average major axis length of 0.1 µm to 1,000 µm may be referred to as "nanotubes".

The material of the conductive fibers is not particularly limited as long as it has conductivity, and the material can be appropriately selected according to the purpose. At least one of a metal and a carbon is preferred. Among these, at least one of metal nanowires, metal nanotubes, and carbon nanotubes is especially preferred as the conductive fibers.

—Metal Nanowires—
—Metal—

The metal of the metal nanowires is not particularly limited, and for example, at least one kind of metal selected from the group of consisting of the metals belonging to the fourth group, the fifth group, and the sixth group of the long periodic table (IUPAC1991) is preferred, at least one kind of metal selected from the metals belonging to the second to fourteenth groups is more preferred, at least one kind of metal selected from the metals belonging to the second, eighth, ninth, tenth, eleventh, twelfth, thirteenth, and fourteenth groups is even more preferred, and these metals are especially preferably contained as main components.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, and alloys thereof. Among these, silver is preferably mainly contained or an alloy of silver and other metals are preferably contained in view of excellent conductivity.

"Silver is preferably mainly contained" means that the silver is contained in the metal nanowires in an amount of 50 mass % or greater, and preferably 90 mass % or greater.

Examples of the metal used in the alloy with silver include platinum, osmium, palladium, and iridium. These may be used singly or in combination of two or more kinds.

—Shape—

The shape of the metal nanowires is not particularly limited, and can be appropriately selected according to the purpose. For example, it is possible to take an arbitrary shape such as a cylindrical shape, a rectangular parallelepiped shape, or a columnar shape with a polygonal cross-section. However, a cylindrical shape or a cross-sectional shape with a polygonal cross-section with rounded corners is preferred when high transparency is required.

The cross-sectional shape of the metal nanowires can be examined by coating a base material with a metal nanowire aqueous dispersion liquid, and by then observing a cross-section using a transmission electron microscope (TEM).

Figure 9:
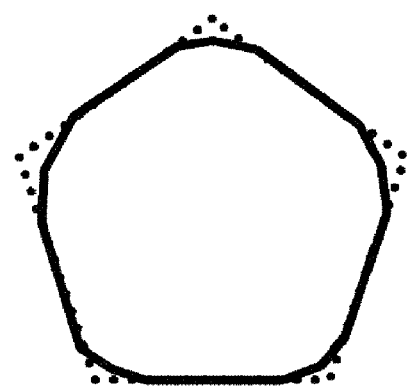
FIG. 9 is an explanatory diagram showing a cross-section of a metal nanowire.

The "corners of the cross-section of the metal nanowires" means portions in the vicinities of intersections where lines formed by extending the respective sides of the cross-section meets perpendicular lines formed by extending sides adjacent thereto. In addition, "the respective sides of the cross-section" are defined as straight lines connecting these adjacent corners. In this case, a proportion of a "length of the outer circumference of the cross-section" to a total length of "the respective sides of the cross-section" is defined as "sharpness". For example, in a cross-section of the metal nanowire shown in FIG. 9, the sharpness can be expressed as a proportion of a length of the outer circumference of the cross-section shown by the solid lines to a length of the outer circumference of the pentagon shown by the dotted lines. When the sharpness is 75% or less, the cross-sectional shape is defined as a cross-sectional shape with round corners. The sharpness is preferably 60% or less, and more preferably 50% or less. When the sharpness is greater than 75%, there may be deterioration in transparency since yellowness remains or an increase in plasmon absorption is caused by electrons locally present at the corners. Moreover, linearity of edge portions of the patterns may be reduced and backlash may occur. The lower limit of the sharpness is preferably 30%, and more preferably 40%.

—Average Minor Axis Length Diameter and Average Major Axis Length—

The average minor axis length of the metal nanowires (may be referred to as "average minor axis diameter" or "average diameter") is preferably 150 nm or shorter, more preferably 1 nm to 40 nm, even more preferably 10 nm to 40 nm, and especially preferably 15 nm to 35 nm.

When the average minor axis length is shorter than 1 nm, oxidation resistance may be deteriorated and durability may be reduced. When the average minor axis length is longer than 150 nm, scattering occurs due to the metal nanowires, and sufficient transparency may not be obtained.

300 metal nanowires are observed using a transmission electron microscope (TEM; manufactured by JEOL, Ltd., JEM-2000FX) and their minor axis lengths are averaged to obtain the average minor axis length of the metal nanowires. When the minor axis of the metal nanowires does not have a circular shape, the longest one is defined as the minor axis length.

The average major axis length of the metal nanowires (may be referred to as "average length") is preferably 1 μm to 40 μm, more preferably 3 μm to 35 μm, and even more preferably 5 μm to 30 μm.

When the average major axis length is shorter than 1 μm, it is difficult to form a compact network and sufficient conductivity may not be obtained. When the average major axis length is longer than 40 μm, the metal nanowires have an excessively long length and get entangled upon manufacturing, and thus aggregates may be formed during the course of manufacturing.

300 metal nanowires are observed using a transmission electron microscope (TEM; manufactured by JEOL, Ltd., JEM-2000FX) and their major axis lengths are averaged to obtain the average major axis length of the metal nanowires. When the metal nanowires are bent, values which are calculated from the radiuses and the curvature of circles based on the arcs thus formed are set as the long axis lengths.

The layer thickness of the conductive photocurable resin layer is preferably 0.1 μm to 20 μm, more preferably 0.5 μm to 18 μm, and especially preferably 1 μm to 15 μm from the viewpoint of stability of the coating liquid and process adaptability such as drying upon the coating and a developing time upon the patterning. The content of the conductive fibers with respect to the total solid content of the conductive photocurable resin layer is preferably 0.01 mass % to 50 mass %, more preferably 0.05 mass % to 30 mass %, and especially preferably 0.1 mass % to 20 mass % from the viewpoint of conductivity and stability of the coating liquid.

(Mask Layer (Colorant))

In addition, when the photosensitive film is used as the mask layer, a colorant can be used in the photocurable resin layer. A known colorant (an organic pigment, an inorganic pigment, a dye, or the like) can be preferably used as the colorant to be used in the invention. In the invention, a mixture of red, blue, green pigments or the like can be used other than a black colorant.

When the photocurable resin layer is used as a black mask layer, a black colorant is preferably contained from the viewpoint of optical density. Examples of the black colorant include carbon black, titanium carbon, iron oxide, titanium oxide, and graphite, and among these, carbon black is preferred.

When the photocurable resin layer is used as a white mask layer, a white pigment described in the paragraphs [0015] and [0114] of JP2005-7765A can be used. In order to use the photocurable resin layer as a mask layer having another color, a pigment described in the paragraphs [0183] to [0185] of JP4546276B or the like, or a mixture with a dye may be used. Specifically, pigments and dyes described in the paragraphs [0038] to [0054] of JP2005-17716A, pigments described in the paragraphs [0068] to [0072] of JP2004-361447A, colorants described in the paragraphs [0080] to [0088] of JP2005-17521A, and the like can be preferably used.

The colorant (preferably a pigment, and more preferably a carbon black) is desirably used as a dispersion liquid. This dispersion liquid can be prepared by adding and dispersing a composition obtained by preliminarily mixing a colorant and a pigment dispersant in an organic solvent (or a vehicle) to be described later. The vehicle is a medium in which a pigment is dispersed when a coating material is in a liquid state. The vehicle includes a component (binder) which has a liquid state and forms a coating film by binding to the pigment and a component (organic solvent) which dissolves and dilutes the above component.

The dispersing machine to be used in the dispersing of the pigment is not particularly limited, and examples thereof include known dispersing machines such as a kneader, a roll mill, an attritor, a super mill, a dissolver, a homomixer, and a sand mill described in "Ganryo no Jiten (A Cyclopedia of Pigments)", First Edition, published by Asakura Shoten, 2000, p. 438. The pigment may also be finely ground using a frictional force through mechanical grinding described on p. 310 of the literature.

The colorant used in the invention preferably has a number average particle diameter of 0.001 μm to 0.1 μm, and more preferably 0.01 μm to 0.08 μm from the viewpoint of dispersion stability. The "particle diameter" mentioned herein is a diameter of a circle having an area equal to that of an electron micrographic image of a particle, and the "number average particle diameter" is an average of particle diameters of 100 particles with respect to the measured particle diameters of many particles.

The layer thickness of the photocurable resin layer containing the colorant is preferably 0.5 μm to 10 μm, more preferably 0.8 μm to 5 μm, and especially preferably 1 μm to 3 μm from the viewpoint of a difference from another layer in thickness. The content ratio of the colorant in the solid content of the colored photosensitive resin composition is not particularly limited, but is preferably 15 mass % to 70 mass %, more preferably 20 mass % to 60 mass %, and even more preferably 25 mass % to 50 mass % from the viewpoint of sufficiently shortening the developing time.

The total solid content mentioned in this specification means a total mass of non-volatile components obtained by removing the solvent or the like from the colored photosensitive resin composition.

When the insulating layer is formed using the photosensitive film, the layer thickness of the photocurable resin layer is preferably 0.1 μm to 5 μm, more preferably 0.3 μm to 3 μm, and especially preferably 0.5 μm to 2 μm from the viewpoint of maintaining an insulation property.

When the transparent protective layer is formed using the photosensitive film, the layer thickness of the photocurable resin layer is preferably 0.1 μm to 10 μm, more preferably 0.5 μm to 5 μm, and especially preferably 1 μm to 3 μm from the viewpoint of exhibiting sufficient protection performance.

<Additives>

The photocurable resin layer may use additives. Examples of the additives include surfactants described in the paragraph [0017] of JP4502784B and in the paragraphs [0060] to [0071] of JP2009-237362A, thermal polymerization inhibitors described in the paragraph [0018] of JP4502784B, and other additives described in the paragraphs [0058] to [0071] of JP2000-310706A.

As the solvent when the photosensitive film is manufactured by coating, a solvent described in the paragraphs [0043] and [0044] described in JP2011-95716A can be used.

The description has been given while focusing on the case in which the photosensitive film is a negative material, but the photosensitive film may be a positive material. When the photosensitive film is a positive material, for example, a material described in JP2005-221726A is used for the photocurable resin layer, but the material of the photocurable resin layer is not limited thereto.

<Viscosities of Thermoplastic Resin Layer and Photocurable Resin Layer>

It is preferable that the viscosity of the thermoplastic resin layer measured at 100° C. be within a region of 1,000 Pa·sec to 10,000 Pa·sec and the viscosity of the photocurable resin layer measured at 100° C. be within a region of 2,000 Pa·sec to 50,000 Pa·sec, and it is more preferable that the following expression (A) be satisfied.

Viscosity of Thermoplastic Resin Layer<Viscosity of Photocurable Resin Layer        Expression (A)

Here, the viscosity of each layer can be measured as follows. A measurement sample is obtained by removing a solvent from a coating liquid for a thermoplastic resin layer or a photocurable resin layer by drying under atmospheric pressure and under reduced pressure, and for example, using Baiburon (DD-III: Toyo Baldwin Co., Ltd.) as a measuring machine, the measurement is performed under conditions of a measurement start temperature of 50° C., a measurement end temperature of 150° C., a rate of temperature increase of 5° C./min, and a frequency of 1 Hz/deg. A value measured at 100° C. can be used.

<Other Layers>

The photosensitive film can be preferably configured by providing an intermediate layer between the photocurable resin layer and the thermoplastic resin layer, or providing a further protective film and the like on the surface of the photocurable resin layer.

An intermediate layer is preferably provided in the photosensitive film for the purpose of preventing mixing of a component during the coating of the plurality of layers and during the preservation after the coating. As the intermediate layer, an oxygen blocking film having an oxygen blocking function, described as the "separation layer" in JP1993-72724A (JP-H05-72724A), is preferred. The sensibility upon exposure is increased, a time load of an exposure machine can be reduced, and productivity is improved.

As the intermediate layer and the protective film, those described in the paragraphs [0083] to [0087] and [0093] of JP2006-259138A can be appropriately used.

<Method of Producing Photosensitive Film>

The photosensitive film can be produced based on a method of producing a photosensitive transfer material described in the paragraphs [0094] to [0098] of JP2006-259138A.

Specifically, when a photosensitive film having an intermediate layer is formed, it can be preferably produced by: coating a temporary support with a liquid (thermoplastic resin layer coating liquid) in which a thermoplastic organic polymer and additives are dissolved; drying the liquid to provide a thermoplastic resin layer; coating this thermoplastic resin layer with a preparation (intermediate layer coating liquid) prepared by adding a resin and additives to a solvent which does not dissolve the thermoplastic resin layer; drying the preparation to laminate an intermediate layer; coating this intermediate layer with a colored photosensitive resin layer coating liquid prepared using a solvent which does not dissolve the intermediate layer; and drying the coating liquid to laminate a colored photosensitive resin layer.

<<Method of Manufacturing Capacitance Type Input Device of Invention>>

As described above, in the method of manufacturing the capacitance type input device of the invention, at least one of the mask layer, the first transparent electrode pattern, the second transparent electrode pattern, the insulating layer, the conductive element, and if necessary, the transparent protective layer is preferably formed using a photosensitive film having a temporary support, a thermoplastic resin layer, and a photocurable resin layer in this order.

When permanent materials such as the mask layer, the insulating layer, the transparent protective layer, the first and second transparent electrode patterns when a conductive photocurable resin layer is used, and the conductive element are formed using a photosensitive film, the photosensitive film is laminated on a base material, and then exposed according to a necessary pattern. An unexposed portion is subjected to development and removed when the photosensitive material is a negative material, and an exposed portion is subjected to development and removed when the photosensitive material is a positive material, thereby obtaining a pattern. In this case, in the development, the thermoplastic resin layer and the photocurable resin layer may be subjected to development and removed using separate liquids or the same liquid. If necessary, known developing equipment such as a brush and a high pressure jet may be combined. After the development, if necessary, post-exposure and post-baking may be performed.

In addition, a non-contact surface of the base material (front face plate) can be preliminarily surface-treated in order to increase the adhesion of the photosensitive resin layer by lamination in the later transfer process. As the surface treatment, a surface treatment (silane coupling treatment) using a silane compound is preferably performed. An agent having a functional group interacting with a photosensitive resin is preferred as a silane coupling agent. For example, a silane coupling agent (a 0.3 mass % aqueous solution of N-β(aminoethyl)γ-aminopropyltrimethoxysilane, product name: KBM603, manufactured by Shin-Etsu Chemical Co., Ltd.) is sprayed for 20 seconds by shower to perform pure water shower washing. Thereafter, a reaction is caused by heating. A heating tank may be used or substrate preheating of a laminator may be performed for promoting the reaction.

The first transparent electrode layer, the second transparent electrode layer, and other conductive members can also be formed using a photosensitive film as a lift-off material. In this case, after patterning is performed using a photosensitive film, transparent conductive layers are formed on the entire surface of a base material, and then a photocurable resin layer is dissolved and removed for each accumulated transparent conductive layer, whereby a desired transparent conductive layer pattern can be obtained (lift-off method).

(In Case of Forming Permanent Materials Using Photosensitive Film)

As for the case in which permanent materials such as the mask layer, the insulating layer, the transparent protective layer, the first transparent film, and the second transparent film are formed using a photosensitive film, a patterning method using the photosensitive film will be described using, as an example, a method of forming the mask layer (black).

The method of forming the mask layer includes: a cover film removing process of removing a cover film from a photosensitive film; a transfer process of transferring, onto a base material, a photosensitive resin layer made of a photosensitive transfer material from which the cover film is removed; an exposure process of exposing the photosensitive resin layer transferred onto the base material; and a developing process of developing the exposed photosensitive resin layer to obtain a pattern image.

—Transfer Process—

The transfer process is a process of transferring, onto a base material, the photocurable resin layer of the photosensitive film from which the cover film is removed.

In this case, a method including: laminating the photocurable resin layer of the photosensitive film on the base material; and removing the temporary support is preferred.

The transfer (bonding) of the photocurable resin layer onto the surface of the base material is performed by overlapping the photocurable resin layer on the surface of the base material, and by then performing pressurization and heating. For bonding, a known laminator such as a laminator, a vacuum laminator, and an auto-cut laminator capable of increasing productivity can be used.

—Exposure Process, Developing Process, and Other Processes—

As an example of the exposure process, the developing process, and other processes, methods described in the paragraphs [0035] to [0051] of JP2006-23696A can also be preferably used in the invention.

The exposure process is a process of exposing the photocurable resin layer transferred onto the base material.

Specific examples thereof include a method including: placing a predetermined mask above the photocurable resin layer formed on the base material; and performing exposure from above the mask via the mask, the thermoplastic resin layer, and the intermediate layer.

Here, a light source for exposure can be appropriately selected and used as long as it can apply light of a wavelength region (for example, 365 nm, 405 nm or the like) that can cure the photocurable resin layer. Specific examples thereof include an ultrahigh pressure mercury lamp, a high pressure mercury lamp, and a metal halide lamp. The exposure amount is generally about 5 mJ/cm$^2$ to 200 mJ/cm$^2$, and preferably about 10 mJ/cm$^2$ to 100 mJ/cm$^2$.

The developing process is a process of developing the exposed photocurable resin layer.

The development can be performed using a developing liquid. The developing liquid is not particularly restricted, and a known developing liquid such as a developing liquid described in JP1993-72724A (JP-H05-72724A) can be used. The developing liquid is preferably a developing liquid with which the photocurable resin layer performs a dissolution type developing behavior, and for example, it preferably contains a compound having a pKa of 7 to 13 at a concentration of 0.05 mol/L to 5 mol/L. Furthermore, a small amount of an organic solvent miscible with water may be added thereto. Examples of the organic solvent miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, and N-methylpyrrolidone. The concentration of the organic solvent is preferably 0.1 mass % to 30 mass %. A known surfactant can be further added to the developing solution. The concentration of the surfactant is preferably 0.01 mass % to 10 mass %.

The developing method may be any one of paddle development, shower development, shower & spin development, dip development, and the like. Here, the shower development will be described. By spraying a developing liquid on the photocurable resin layer after the exposure by shower, an uncured portion can be removed. When a thermoplastic resin layer and an intermediate layer is provided, an alkaline liquid having poor ability to dissolve the photocurable resin layer is preferably sprayed by shower or the like before development, so as to remove the thermoplastic resin layer and the intermediate layer. After the development, a washing agent or the like is preferably sprayed by shower to remove developing residues while performing rubbing using a brush or the like. The liquid temperature of the developing liquid is preferably 20° C. to 40° C., and the pH of the developing liquid is preferably 8 to 13.

The method of manufacturing the capacitance type input device may have other processes such as a post-exposure process and a post-baking process.

The patterning exposure may be performed after peeling of the temporary support. Otherwise, the exposure may be performed before peeling of the temporary support, and then the temporary support may be peeled. The exposure may be performed via a mask, or digital exposure using laser may also be performed.

(In Case of Using Photosensitive Film as Etching Resist)

When the photosensitive film is used as an etching resist (etching pattern), a resist pattern can be obtained with a similar method. As for the etching, the etching and the resist peeling can be applied using known methods described in the paragraphs [0048] to [0054] of JP2010-152155A or the like.

Examples of the etching method include a wet etching method including dipping in an etching liquid, which is generally performed. As the etching liquid to be used in the wet etching, an acidic or alkaline etching liquid may be appropriately selected according to an etching target. Examples of the acidic etching liquid include aqueous solutions of acidic components alone, such as a hydrochloric acid, a sulfuric acid, a hydrofluoric acid, and a phosphoric acid, and mixed aqueous solutions of acidic components and salts such as ferric chloride, ammonium fluoride, and potassium permanganate. As the acidic component, a combination of a plurality of acidic components may be used. In addition, examples of the alkaline etching liquid include aqueous solutions of alkaline components alone, such as sodium hydroxide, potassium hydroxide, ammonia, organic amine, and organic amine salt such as tetramethylammonium hydroxide, and mixed aqueous solutions of alkaline components and salts such as potassium permanganate. As the alkaline component, a combination of a plurality of alkaline components may be used.

The temperature of the etching liquid is not particularly limited, but is preferably 45° C. or lower. The resin pattern to be used as an etching mask (etching pattern) in the invention exhibits particularly excellent resistance to acidic and alkali etching liquids in such a temperature region by being formed using the above-described photocurable resin layer. Accordingly, the resin pattern is prevented from being peeled during the etching process, and thus a portion where the resin pattern does not exist is selectively etched.

After the etching, if necessary, a washing process and a drying process may be performed in order to prevent line contamination. In the washing process, for example, the base material may be washed for 10 seconds to 300 seconds with pure water at room temperature, and in the drying process, the drying may be performed by appropriately adjusting an air blow pressure (about 0.1 kg/cm$^2$ to 5 kg/cm$^2$) using an air blower.

Next, the resin pattern peeling method is not particularly limited. Examples thereof include a method including dipping a base material for 5 minutes to 30 minutes in a peeling liquid during stirring at 30° C. to 80° C., preferably 50° C. to 80° C. The resin pattern to be used as an etching mask in the invention shows excellent resistance to a chemical solution at 45° C. or lower as described above, but shows a swelling property with an alkaline peeling liquid when a chemical solution temperature is 50° C. or higher. Using such a property, when the peeling process is performed using a peeling liquid having a temperature of 50° C. to 80° C., the processing time is reduced, and thus there is an advantage in that peeling residues of the resin pattern are reduced. That is, by setting a difference in chemical solution temperature between the etching process and the peeling process, the resin pattern to be used as an etching mask in the invention exhibits good resistance to a chemical solution in the etching process and shows good peelability in the peeling process, and thus both of conflicting characteristics, i.e., resistance to a chemical solution and peelability can be satisfied.

Examples of the peeling liquid include a liquid in which an inorganic alkalicone component such as sodium hydroxide or potassium hydroxide, or an organic alkaline component such as tertiary amine or quaternary ammonium salt is dissolved in water, dimethylsulfoxide, N-methylpyrrolidone, or a mixed solvent thereof. Using the above-described peeling liquid, the peeling may be performed through a spray method, a shower method, a paddle method, or the like.

[Image Display Device Provided with Capacitance Type Input Device as Constituent Element]

An image display device of the invention is characterized in that it is provided with the capacitance type input device of the invention as a constituent element.

Configurations disclosed in "Latest Touch Panel Technology (Saishin Touch Panel Gijutsu)" (published on Jul. 6, 2009, Techno Times), supervised by Yuji Mitani, "Technology and Development of Touch Panel (Touch Panel no Gijustu to Kaihatsu)," published by CMC (December, 2004), "FPD International 2009 Forum T-11 Lecture Text Book", "Cypress Semiconductor Corporation Application Note AN2292" and the like can be applied to the capacitance type input device of the invention and the image display device provided with the capacitance type input device as a constituent element.

EXAMPLES

The invention will be described in further detail using the following examples. The materials, amounts, ratios, contents and procedures of treatments and the like shown in the following examples can be appropriately changed as long as such changes do not depart from the gist of the invention. Accordingly, the scope of the invention is not limited to the following specific examples. Unless specifically noted, "parts" and "%" are based on the mass.

Examples 1 to 5 and 7 to 11 and Comparative Examples 1 to 5 and 7 to 15

Manufacturing of Transparent Laminate

<Formation of First Transparent Film>

A first transparent film having a refractive index and a film thickness shown in the following Table 1 was formed on a transparent glass substrate having a refractive index of 1.5 or 1.51 through the following method.

TABLE 1

| | Film Forming Method | Material | Refractive Index | Content of Metal Oxide Particles [mass %] | Film Thickness [nm] |
| --- | --- | --- | --- | --- | --- |
| Transparent Film 1 | Spin Coating | Material 1 | 1.51 | 0.0 | 80 |
| Transparent Film 2 | Spin Coating | Material 1 | 1.51 | 0.0 | 130 |
| Transparent Film 3 | Sputtering Film Formation | See the following Table 3 | 15.51 | — | 61 |
| Transparent Film 4 | Lamination Film Formation | Material 1 | 1.51 | 0.0 | 78 |
| Transparent Film 5 | Spin Coating | Material 2 | 1.56 | 20.0 | 92 |
| Transparent Film 6 | Spin Coating | Material 3 | 1.58 | 30.0 | 89 |
| Transparent Film 7 | Spin Coating | Material 4 | 1.6 | 40.0 | 90 |
| Transparent Film 8 | Spin Coating | Material 5 | 1.65 | 65.0 | 83 |
| Transparent Film 9 | Spin Coating | Material 6 | 1.7 | 60.0 | 78 |
| Transparent Film 10 | Spin Coating | Material 7 | 1.74 | 65.0 | 70 |
| Transparent Film 11 | Spin Coating | Material 8 | 1.78 | 69.8 | 75 |
| Transparent Film 12 | Spin Coating | Material 9 | 1.83 | 79.9 | 89 |
| Transparent Film 13 | Spin Coating | Material 5 | 1.65 | 65.0 | 50 |
| Transparent Film 14 | Spin Coating | Material 5 | 1.65 | 65.0 | 115 |
| Transparent Film 15 | Spin Coating | Material 6 | 1.7 | 60.0 | 48 |
| Transparent Film 16 | Lamination Film Formation | Material 6 | 1.7 | 60.0 | 420 |
| Transparent Film 17 | Sputtering Film Formation | See the following Table 3 | 1.68 | — | 70 |
| Transparent Film 18 | Sputtering Film Formation | See the following Table 3 | 1.85 | — | 90 |
| Transparent Film 19 | Spin Coating | Material 5 | 1.65 | 65.0 | 108 |
| Transparent Film 20 | Spin Coating | Material 5 | 1.65 | 65.0 | 56 |
| Transparent Film 21 | Spin Coating | Material 8 | 1.78 | 69.8 | 98 |

(1) Spin Coating: Formation of Transparent Films 1, 2, 5 to 15, and 19 to 21

Each of transparent curable composition materials 1 to 9 prepared according to compositions described in the following Table 2 was spin-coated on a transparent glass substrate by spin coating (using MIKASA SPINCOATER 1H-D7 manufactured by MIKASA Co., Ltd; 1,000 rpm). Preheating (prebaking) was performed for 120 seconds at 100° C., and then the entire coating surface was exposed with 50 mJ/cm$^2$ of i-rays using a proximity type exposure machine (manufactured by Hitachi High-Technologies Corporation) having an ultrahigh pressure mercury lamp. Next, post-heating (post-baking) was performed thereon for 60 minutes at 230° C. to obtain a substrate in which a first transparent film shown in the above Table 1 was laminated on the transparent glass substrate. In the following Table 2 and the following general formula (1), "%" and "wt %" represent mass %.

ZrO$_2$: The fact that the pigment concentration of ZR-010 (zirconium oxide dispersion liquid, product name: nano5 ZR-010) manufactured by Solar Co., Ltd. is 30 mass % is known on the filing date of the application. For example, there is a description in a catalog (Kitamura Chemicals Co., Ltd., No. 1202033, published on February 2012) related to nano5 ZR-010 of Solar Co., Ltd.

TABLE 2

| Material | Material 1 | Material 2 | Material 3 | Material 4 | Material 5 | Material 6 | Material 7 | Material 8 | Material 9 |
|---|---|---|---|---|---|---|---|---|---|
| ZrO$_2$: manufactured by Solar Co., Ltd., ZR-010 | 0 | 3.33 | 5 | 6.67 | 10.83 | 10 | 10.83 | 11.67 | 13.33 |
| DPHA Liquid (Dipentaerythritol Hexaacrylate: 38%, Dipentaerythritol Pentaacrylate: 38%, 1-Methoxy-2-Propyl Acetate: 24%) | 0.76 | 0.61 | 0.53 | 0.46 | 0.27 | 0.3 | 0.27 | 0.23 | 0.15 |
| Urethane-based Monomer: UK Oligo UA-32P, manufactured by Shin-Nakamura Chemical Co., Ltd.: non-volatile content of 75%, 25% of 1-Methoxy-2-Propyl Acetate | 0.36 | 0.29 | 0.25 | 0.22 | 0.13 | 0.14 | 0.13 | 0.11 | 0.07 |
| Monomer Mixture (polymerizable compound (b2-1) described in paragraph [0111] of JP2012-78528A, n = 1: tripentaerythritol octaacrylate content: 85%, total of n = 2 and n = 3 as impurities: 15%) | 0.96 | 0.77 | 0.67 | 0.57 | 0.33 | 0.38 | 0.33 | 0.29 | 0.19 |
| Polymer Solution 1 (structural formula P-25 described in paragraph [0058] of JP2008-146018A: weight average molecular weight of 35,000, solid content of 45%, 15% of 1-methoxy-2-propyl acetate, 40% of 1-methoxy-2-propanol) | 6.69 | 5.35 | 4.68 | 4.01 | 2.33 | 2.67 | 2.33 | 2 | 1.33 |
| 2-Benzyl-2-Dimethylamino-1-(4-Morpholino Phenyl)-Butanone (Irgacure 379, manufactured by BASF) | 0.09 | 0.07 | 0.06 | 0.05 | 0.03 | 0.04 | 0.03 | 0.03 | 0.02 |
| Kayacure-DETX-S (manufactured by Nippon Kayaku Co., Ltd., alkylthioxanthone) | 0.09 | 0.07 | 0.06 | 0.05 | 0.03 | 0.04 | 0.03 | 0.03 | 0.02 |
| Polymer Solution 2 (the following general formula (1): weight average molecular weight of 15,000, non-volatile content of 30 wt %, 70 wt % of methyl ethyl ketone) | 0.03 | 0.03 | 0.03 | 0.03 | 0.03 | 0.03 | 0.03 | 0.03 | 0.03 |
| 1-Methoxy-2-Propyl Acetate | 52.99 | 53.24 | 53.37 | 53.49 | 53.81 | 53.74 | 53.81 | 53.87 | 54 |
| Methyl Ethyl Ketone | 38.04 | 36.25 | 35.35 | 34.46 | 32.21 | 32.66 | 32.21 | 31.77 | 30.86 |
| Content of Metal Oxide Particles [mass %] | 0.0 | 20.0 | 30.0 | 40.0 | 65.0 | 60.0 | 65.0 | 69.8 | 79.9 |
| Total (parts by mass) | 100 | 100 | 100 | 100 | 100 | 100 | 100 | 100 | 100 |

[Chem. 1]

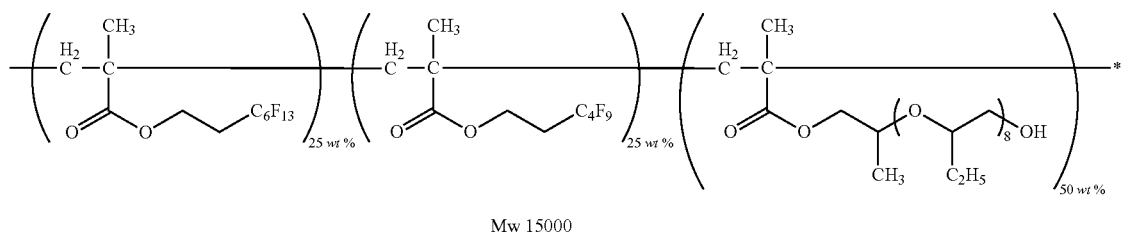

General Formula (1)

Mw 15000

(2) Sputtering Film Formation: Formation of Transparent Films 3, 17, and 18

Films were formed according to the following procedures using a thin film forming device which was provided with a transparent glass substrate disposed in a vacuum chamber, a $SiO_2$ target and an $Nb_2O_5$ target as sputtering targets disposed at positions on the same circumference on the same plane opposed to the substrate, a power source applying electric power to each target, and a substrate rotation mechanism rotating at a position opposed to the target.

First, a transparent glass substrate was set, and then the vacuum chamber was exhausted up to a predetermined pressure (for example, $7 \times 10^{-5}$ Pa) using a high vacuum pump. All of valves were opened, and then an Ar gas was introduced from a gas introduction port for a $SiO_2$ target so that a total pressure reached $4 \times 10^{-1}$ Pa in a vacuum gauge. An $O_2$ gas was then introduced from the gas introduction port up to a pressure of $5 \times 10^{-1}$ Pa. Next, AC power of 300 W was applied from an AC source to generate plasma on the $SiO_2$ of the $SiO_2$ target. An Ar gas was introduced up to a pressure of $7 \times 10^{-1}$ Pa in the vacuum gauge from a gas introduction port for an $Nb_2O_5$ target. An $O_2$ gas was then introduced from the gas introduction port up to a pressure of 1.0 Pa. Next, DC power of 300 W was applied from a DC source to generate plasma on the $Nb_2O_5$ target. In addition, from each application electric power, the application electric power to be applied to the $SiO_2$ target and the application electric power to be applied to the $Nb_2O_5$ target were set as shown in the following Table 3 according to the refractive index of the mixed film, and then respective shutters immediately above the $SiO_2$ target and the $Nb_2O_5$ target were simultaneously opened or closed for approximately 60 minutes to obtain a substrate in which a first transparent film having a refractive index and a film thickness adjusted as shown in the following Table 3 was laminated on the transparent glass substrate.

coated and dried on a polyethylene terephthalate film temporary support having a thickness of 75 μm. Next, an intermediate layer coating liquid having the following prescription P1 was coated and dried thereon. Furthermore, a transparent curable composition material 1 or 6 prepared according to the composition described in the above Table 2 was coated and dried thereon. In this manner, on the temporary support, a thermoplastic resin layer having a dried film thickness of 15.1 μm, an intermediate layer having a dried film thickness of 1.6 μm, and a transparent curable resin layer having a dried film thickness shown in the above Table 1 were provided, and finally, a protective film (a polypropylene film having a thickness of 12 μm) was pressure-bonded thereto. Therefore, a transfer material in which the temporary support, the thermoplastic resin layer, the intermediate layer (oxygen blocking film), and the transparent curable resin layer were formed integrally with each other was produced.

(Thermoplastic Resin Layer Coating Liquid: Prescription H1)

Methanol: 11.1 parts by mass
Propylene Glycol Monomethyl Ether Acetate: 6.36 parts by mass
Methyl Ethyl Ketone: 52.4 parts by mass
Methyl Methacrylate/2-Ethylhexyl Acrylate/Benzyl Methacrylate/Methacrylic Acid Copolymer (copolymerization composition ratio (molar ratio)=55/11.7/4.5/28.8, molecular weight=100,000, Tg≅70° C.): 5.83 parts by mass
Styrene/Acrylic Acid Copolymer (copolymerization composition ratio (molar ratio)=63/37, weight average molecular weight=10,000, Tg≅100° C.): 13.6 parts by mass
Monomer 1 (product name: BPE-500, manufactured by Shin-Nakamura Chemical Co., Ltd.): 9.1 parts by mass
Fluorine-based Polymer: 0.54 parts by mass The fluorine-based polymer is a copolymer of 40 parts of $C_6F_{13}CH_2CH_2OCOCH=CH_2$, 55 parts of $H(OCH(CH_3)CH_2)_7OCOCH=CH_2$, and 5 parts of $H(OCHCH_2)_7OCOCH=CH_2$, and is a solution of methyl ethyl ketone (30 mass %) having a weight average molecular weight of 30,000 (product name: Megafac F780F, manufactured by DIC Corporation).

TABLE 3

|  | $SiO_2$ Application Electric Power [W] | $Nb_2O_5$ Application Electric Power [W] | Refractive Index | Film Thickness [nm] |
| --- | --- | --- | --- | --- |
| Transparent Film 3 | 300 | 100 | 1.51 | 61 |
| Transparent Film 17 | 250 | 130 | 1.68 | 70 |
| Transparent Film 18 | 200 | 270 | 1.85 | 90 |

(3) Lamination Film Formation: Formation of Transparent Films 4 and 16

(Preparation of Transfer Material)

Using a slit-shaped nozzle, a thermoplastic resin layer coating liquid having the following prescription H1 was (Intermediate Layer Coating Liquid: Prescription P1)
Polyvinyl Alcohol (product name: PVA205, manufactured by Kuraray Co., Ltd., saponification degree=88%, polymerization degree: 550): 32.3 parts by mass
Polyvinyl Pyrrolidone (product name: K-30, manufactured by ISP Japan): 14.9 parts by mass
Distilled Water: 524 parts by mass
Methanol: 429 parts by mass (Formation of Transparent Film)

The transparent curable resin layer was peeled from an interface with the PET temporary support, and then transferred onto the transparent glass substrate together with the thermoplastic resin and the intermediate layer.

Next, using a proximity type exposure machine (manufactured by Hitachi High-Technologies Corporation) having an ultrahigh pressure mercury lamp, the entire surface was exposed with 40 mJ/cm$^2$ of i-rays from the thermoplastic resin layer side. Next, using a triethanol amine-based developing liquid (containing triethanol amine (30%), a liquid obtained by diluting T-PD2 (product name, manufactured by Fujifilm Corporation) 10 folds (mixing at a ratio of 9 parts of pure water to 1 part of T-PD2) with pure water), shower development was performed at 30 C for 60 seconds with a flat nozzle pressure of 0.04 MPa, and the thermoplastic resin and the intermediate layer were removed. Then, air was blown to the upper surface (transparent curable resin layer side) of the transparent glass substrate to drain the liquid, and then pure water was sprayed for 10 seconds by shower to perform pure water shower washing, and air was blown to reduce the liquid pool on the transparent glass substrate. Next, the substrate was heat-treated (post-baked) for 60 minutes at 230° C., and thus a substrate in which a first transparent film shown in the above Table 1 was laminated on the transparent glass substrate was obtained.

<Formation of Transparent Electrode Pattern>

(Formation of Transparent Electrode Layer Used in Example 1)

In Example 1, the substrate in which the first transparent film was laminated on the transparent glass substrate was introduced into a vacuum chamber, and an ITO thin film having a thickness of 40 nm and a refractive index of 1.82 was formed thereon using an ITO target (indium:tin=95:5 (molar ratio)) having a SnO$_2$ content of 10 mass % through DC magnetron sputtering (conditions: base material temperature of 250° C., argon pressure of 0.13 Pa, oxygen pressure of 0.01 Pa) to obtain a front face plate having a transparent electrode layer formed thereon. The surface resistance of the ITO thin film was 80 Ω/□.

(Preparation of Photosensitive Film E1 for Etching)

Using a slit-shaped nozzle, a thermoplastic resin layer coating liquid having the above-described prescription H1 was coated and dried on a polyethylene terephthalate film temporary support having a thickness of 75 μm. Next, an intermediate layer coating liquid having the above-described prescription P1 was coated and dried thereon. Furthermore, a coating liquid for a photocurable resin layer for etching having a prescription E1 was coated and dried thereon. In this manner, on the temporary support, a lamination formed of a thermoplastic resin layer having a dried film thickness of 15.1 μm, an intermediate layer having a dried film thickness of 1.6 μm, and a photocurable resin layer for etching having a film thickness of 2.0 μm was obtained, and finally, a protective film (a polypropylene film having a thickness of 12 μm) was pressure-bonded thereto. Therefore, a transfer material in which the temporary support, the thermoplastic resin layer, the intermediate layer (oxygen blocking film), and the transparent curable resin layer were formed integrally with each other was produced.

(Coating Liquid for Photocurable Resin Layer for Etching: Prescription E1)
Methyl Methacrylate/Styrene/Methacrylic Acid Copolymer (copolymer composition (mass %): 31/40/29, mass average molecular weight: 60,000, acid value: 163 mgKOH/g): 16 parts by mass
Monomer 1 (product name: BPE-500, manufactured by Shin-Nakamura Chemical Co., Ltd.): 5.6 parts by mass
0.5 mol Adduct of Tetraethylene Oxide Monomethacrylate of Hexamethylenediisocyanate: 7 parts by mass
Cyclohexanedimethanol Monoacrylate as Compound Having One Polymerizable Group in Molecule: 2.8 parts by mass
2-Chloro-N-Butyl Acridone: 0.42 parts by mass
2,2-Bis(o-Chlorophenyl)-4,4',5,5'-Tetraphenyl Biimidazole: 2.17 parts by mass
Malachite Green Oxalate: 0.02 parts by mass
Leuco Crystal Violet: 0.26 parts by mass
Phenothiazine: 0.013 parts by mass
Surfactant (product name: Megafac F-780F, manufactured by DIC Corporation): 0.03 parts by mass
Methyl Ethyl Ketone: 40 parts by mass
1-Methoxy-2-Propanol: 20 parts by mass The viscosity of the coating liquid E1 for a photocurable resin layer for etching at 100° C. after solvent removal was 2,500 Pa·sec.

(Formation of Transparent Electrode Pattern)

The front face plate having the transparent electrode layer formed thereon was washed, and a photosensitive film E1 for etching from which a protective film was removed was laminated thereon (base material temperature: 130° C., rubber roller temperature: 120° C., linear pressure: 100 N/cm, transport speed: 2.2 m/min). After peeling of the temporary support, a distance between a surface of an exposure mask (a quartz exposure mask having a transparent electrode pattern) and the photocurable resin layer for etching was set to 200 μm, and pattern exposure was performed with an exposure of 50 mJ/cm$^2$ (i-rays).

Next, using a triethanol amine-based developing liquid (containing 30 mass % of triethanol amine, a liquid obtained by diluting T-PD2 (product name, manufactured by Fujifilm Corporation) 10 folds with pure water), a treatment was performed for 100 seconds at 25° C., and using a surfactant-containing washing liquid (a liquid obtained by diluting T-SD3 (product name, manufactured by Fujifilm Corporation) 10 folds with pure water), a treatment was performed for 20 seconds at 33° C. Residues were removed using a rotation brush and an ultrahigh pressure washing nozzle, and a post-baking treatment was performed for 30 minutes at 130° C. to obtain a front face plate on which the transparent electrode layer and the photocurable resin layer pattern for etching were formed.

The front face plate on which the transparent electrode layer and the photocurable resin layer pattern for etching were formed was dipped in an etching tank containing an ITO etchant (an aqueous solution of hydrochloric acid and potassium chloride, liquid temperature: 30° C.) and treated for 100 seconds to dissolve and remove the transparent electrode layer in an exposed region which was not covered with the photocurable resin layer for etching, and thus a front face plate with the transparent electrode layer pattern having the photocurable resin layer pattern for etching was obtained.

Next, the front face plate with the transparent electrode layer pattern having the photocurable resin layer pattern for etching was dipped in a resist peeling tank containing a resist peeling liquid (N-methyl-2-pyrrolidone, monoethanolamine, surfactant (product name: Surfynol 465, manufactured by Air Products and Chemicals, Inc.), liquid temperature: 45° C.) and treated for 200 seconds to remove the photocurable resin layer for etching, and thus a substrate in which the first transparent film and the transparent electrode pattern were formed on the transparent glass substrate was obtained.

An end portion of the transparent electrode pattern was subjected to Pt coating (approximately 20 nm thickness) to impart conductivity and to protect the surface, and then the shape of the end portion of the transparent electrode pattern was observed (secondary electron image, acceleration voltage: 20 kV) using a FIB/SEM multifunction machine Nova 200 manufactured by FEI Company.

The ITO pattern formed in Example 1 has a tapered shape as shown in FIG. 10, and a taper angle α thereof was approximately 3°.

In other examples and comparative examples, a transparent electrode layer used to have a refractive index and a film thickness described in the following Table 4 was prepared in the same manner as in Example 1 to obtain a substrate in which a first transparent film and a transparent electrode pattern were formed on a transparent glass substrate.

<Formation of Second Transparent Film>

A second transparent film having a refractive index and a film thickness shown in the above Table 1 was formed in the same manner as in the formation of the first transparent film on the substrate in which the first transparent film and the transparent electrode pattern were formed on the transparent glass substrate.

In this manner, a substrate in which the first transparent film, the transparent electrode pattern, and the second transparent film were formed on the transparent glass substrate was obtained.

<Formation of Transparent Protective Film>

(Method of Forming Transparent Protective Film A)

Using a photosensitive resin layer coating liquid prescription 1 described in Example 1 of JP2012-78528A, a photosensitive transfer film in which a temporary support, a thermoplastic resin layer, an intermediate layer, and a photosensitive resin layer were formed integrally with each other was prepared according to the method described in the paragraphs [0103] to [0113] of JP2012-78528A.

The photosensitive resin layer of the prepared photosensitive transfer film was peeled in an interface with the PET temporary support, and then transferred, together with the thermoplastic resin and the intermediate layer, onto the substrate in which the first transparent film, the transparent electrode pattern, and the second transparent film were formed on the transparent glass substrate.

Next, using a proximity type exposure machine (manufactured by Hitachi High-Technologies Corporation) having an ultrahigh pressure mercury lamp, the entire surface was exposed with 40 mJ/cm$^2$ of i-rays from the thermoplastic resin layer side. Next, using a triethanol amine-based developing liquid (containing triethanol amine (30%), a liquid obtained by diluting T-PD2 (product name, manufactured by Fujifilm Corporation) 10 folds (mixing at a ratio of 9 parts of pure water to 1 part of T-PD2) with pure water), shower development was performed at 30 C for 60 seconds with a flat nozzle pressure of 0.04 MPa, and the thermoplastic resin and the intermediate layer were removed. Then, air was blown to the upper surface (photosensitive resin layer side) of the transparent glass substrate, and then pure water was sprayed for 10 seconds by shower to perform pure water shower washing, and air was blown to reduce the liquid pool on the transparent glass substrate. Next, the substrate was heat-treated (post-baked) for 60 minutes at 230° C., and thus transparent laminates of the examples and the comparative examples in which a transparent protective film having a refractive index and a film thickness shown in the following Table 4 was laminated on the substrate in which the first transparent film, the transparent electrode pattern, and the second transparent film were formed on the transparent glass substrate were obtained.

Transparent laminates of the examples and the comparative examples in which the following transparent protective films B to E were respectively laminated on a substrate in which a first transparent film, a transparent electrode pattern, and a second transparent film were formed on a transparent glass substrate were obtained in the same manner as in the method of forming the transparent protective film A, except that the prescription of the photosensitive resin layer coating liquid was changed as follows.

Transparent Protective Film B: Composition Described in Example 3 of JP2012-78528A Transparent Protective Film C: Composition Described in Example 25 of JP2012-78528A Transparent Protective Film D: Composition Described in Example 26 of JP2012-78528A Transparent Protective Film E: Composition Described in Example 27 of JP2012-78528A The refractive indices and the film thicknesses of the respective transparent protective films were shown in the following Table 4.

<Evaluation of Visibility of Transparent Electrode Pattern>

A transparent laminate in which a first transparent film, a transparent electrode pattern, a second transparent film, and a transparent protective film were laminated in order on a transparent glass substrate was adhered to a black PET material via a transparent adhesive tape (manufactured by 3M, product name: OCA tape 8171CL) to shield the entire substrate from light.

To confirm the visibility of the transparent electrode pattern, a fluorescent lamp (light source) and the prepared substrate were placed in a darkroom, light was made incident from the glass surface side, and the light reflected from the glass surface was then visually observed at an angle.

<<Evaluation Standards>>

A: The ITO pattern is not seen at all.

B: The ITO pattern is slightly seen, but is not almost seen.

C: The ITO pattern is seen well.

The obtained results were described in the following Table 4.

TABLE 4

| | Configuration of Transparent Laminate | | | | | | |
|---|---|---|---|---|---|---|---|
| | | First Transparent Film | | | | Transparent Electrode Pattern | |
| | Transparent Substrate Refractive Index | Kind | Refractive Index | Content of Metal Oxide Particles [mass %] | Film Thickness [nm] | Refractive Index | Film Thickness [nm] |
| Example 1 | 1.51 | Transparent Film 7 | 1.6 | 40.0 | 90 | 1.82 | 40 |
| Example 2 | 1.5 | Transparent Film 8 | 1.65 | 65.0 | 83 | 1.9 | 45 |
| Example 3 | 1.51 | Transparent Film 9 | 1.7 | 60.0 | 78 | 1.85 | 50 |
| Example 4 | 1.51 | Transparent Film 10 | 1.74 | 65.0 | 70 | 1.82 | 57 |
| Example 5 | 1.51 | Transparent Film 11 | 1.78 | 69.8 | 75 | 1.83 | 62 |
| Example 7 | 1.5 | Transparent Film 8 | 1.65 | 65.0 | 83 | 1.9 | 38 |
| Example 8 | 1.51 | Transparent Film 9 | 1.7 | 60.0 | 90 | 2 | 55 |
| Example 9 | 1.51 | Transparent Film 8 | 1.65 | 65.0 | 83 | 1.95 | 72 |
| Example 10 | 1.51 | Transparent Film 17 | 1.68 | — | 70 | 1.78 | 61 |
| Example 11 | 1.51 | Transparent Film 9 | 1.7 | 60.0 | 78 | 1.83 | 45 |
| Comparative Example 1 | 1.51 | Transparent Film 1 | 1.51 | 0.0 | 80 | 1.85 | 42 |
| Comparative Example 2 | 1.51 | Transparent Film 2 | 1.51 | 0.0 | 130 | 1.79 | 38 |
| Comparative Example 3 | 1.51 | Transparent Film 3 | 1.51 | — | 61 | 1.81 | 54 |
| Comparative Example 4 | 1.51 | Transparent Film 4 | 1.51 | 0.0 | 78 | 1.9 | 55 |
| Comparative Example 5 | 1.51 | Transparent Film 5 | 1.56 | 20.0 | 72 | 2.1 | 57 |
| Comparative Example 7 | 1.51 | Transparent Film 13 | 1.65 | 65.0 | 50 | 1.85 | 56 |
| Comparative Example 8 | 1.51 | Transparent Film 14 | 1.65 | 65.0 | 115 | 1.87 | 61 |
| Comparative Example 9 | 1.51 | Transparent Film 15 | 1.7 | 60.0 | 48 | 1.94 | 48 |
| Comparative Example 10 | 1.51 | Transparent Film 16 | 1.7 | 60.0 | 120 | 1.85 | 52 |
| Comparative Example 11 | 1.51 | Transparent Film 18 | 1.85 | — | 90 | 1.92 | 49 |
| Comparative Example 12 | 1.51 | Transparent Film 19 | 1.65 | 65.0 | 115 | 1.88 | 50 |
| Comparative Example 13 | 1.51 | Transparent Film 20 | 1.65 | 65.0 | 53 | 1.89 | 51 |
| Comparative Example 14 | 1.51 | Transparent Film 21 | 1.78 | 69.8 | 115 | 1.92 | 53 |
| Comparative Example 15 | 1.51 | Transparent Film 8 | 1.65 | 65.0 | 83 | 1.9 | 38 |

TABLE 4-continued

| | Configuration of Transparent Laminate | | | | | | Evaluation Visibility of Transparent Electrode Pattern |
|---|---|---|---|---|---|---|---|
| | Second Transparent Film | | | | Transparent Protective Film | | |
| | Kind | Refractive Index | Content of Metal Oxide Particles [mass %] | Film Thickness [nm] | Kind | Refractive Index | Film Thickness [μm] | |
| Example 1 | Transparent Film 7 | 1.6 | 40.0 | 90 | Transparent Protective Film A | 1.51 | 2.0 | B |
| Example 2 | Transparent Film 8 | 1.65 | 65.0 | 83 | Transparent Protective Film A | 1.51 | 2.5 | A |
| Example 3 | Transparent Film 9 | 1.7 | 60.0 | 78 | Transparent Protective Film A | 1.51 | 1.8 | A |
| Example 4 | Transparent Film 10 | 1.74 | 65.0 | 70 | Transparent Protective Film A | 1.51 | 1.5 | A |
| Example 5 | Transparent Film 11 | 1.78 | 69.8 | 75 | Transparent Protective Film A | 1.51 | 3.0 | B |
| Example 7 | Transparent Film 9 | 1.7 | 60.0 | 78 | Transparent Protective Film B | 1.5 | 4.1 | A |
| Example 8 | Transparent Film 9 | 1.7 | 60.0 | 78 | Transparent Protective Film C | 1.52 | 1.9 | A |
| Example 9 | Transparent Film 9 | 1.7 | 60.0 | 78 | Transparent Protective Film D | 1.51 | 1.0 | A |
| Example 10 | Transparent Film 8 | 1.65 | 65.0 | 83 | Transparent Protective Film E | 1.51 | 1.2 | A |
| Example 11 | Transparent Film 21 | 1.78 | 69.8 | 98 | Transparent Protective Film A | 1.51 | 2.0 | B |
| Comparative Example 1 | Transparent Film 1 | 1.51 | 0.0 | 80 | Transparent Protective Film A | 1.51 | 2.5 | C |
| Comparative Example 2 | Transparent Film 2 | 1.51 | 0.0 | 130 | Transparent Protective Film A | 1.51 | 2.2 | C |
| Comparative Example 3 | Transparent Film 3 | 1.51 | — | 61 | Transparent Protective Film A | 1.51 | 2.1 | C |
| Comparative Example 4 | Transparent Film 4 | 1.51 | 0.0 | 78 | Transparent Protective Film A | 1.51 | 1.9 | C |
| Comparative Example 5 | Transparent Film 4 | 1.51 | 0.0 | 78 | Transparent Protective Film A | 1.51 | 1.5 | C |
| Comparative Example 7 | Transparent Film 13 | 1.65 | 65.0 | 50 | Transparent Protective Film B | 1.5 | 1.7 | C |
| Comparative Example 8 | Transparent Film 14 | 1.65 | 65.0 | 115 | Transparent Protective Film C | 1.52 | 1.8 | C |
| Comparative Example 9 | Transparent Film 15 | 1.7 | 60.0 | 48 | Transparent Protective Film D | 1.51 | 2.1 | C |
| Comparative Example 10 | Transparent Film 16 | 1.7 | 60.0 | 120 | Transparent Protective Film E | 1.51 | 2.3 | C |
| Comparative Example 11 | Transparent Film 18 | 1.85 | — | 90 | Transparent Protective Film A | 1.51 | 3.1 | C |
| Comparative Example 12 | Transparent Film 19 | 1.65 | 65.0 | 113 | Transparent Protective Film A | 1.51 | 2.3 | C |
| Comparative Example 13 | Transparent Film 20 | 1.65 | 65.0 | 51 | Transparent Protective Film A | 1.51 | 2.1 | C |
| Comparative Example 14 | Transparent Film 21 | 1.78 | 69.8 | 115 | Transparent Protective Film A | 1.51 | 2.1 | C |

TABLE 4-continued

| | | | | | | | | |
|---|---|---|---|---|---|---|---|---|
| Comparative Example 15 | — | — | — | — | Transparent Protective Film A | 1.51 | 2.5 | C |

From the above Table 4, it was found that the transparent laminate of the invention does not have a problem in which the transparent electrode pattern is visually recognized.

The transparent laminates of Comparative Examples 1, 4, and 5 in which the content of the metal oxide particles of the second transparent film were lower than the lower limit value of the range defined in the invention had a problem in which the transparent electrode pattern is visually recognized.

The transparent laminate of Comparative Example 2 in which the content of the metal oxide particles of the second transparent film were lower than the lower limit value of the range defined in the invention and the film thicknesses of the first transparent film and the second transparent film were greater than the upper limit value of the range defined in the invention had a problem in which the transparent electrode pattern is visually recognized.

The transparent laminates of Comparative Examples 7 and 9 in which the film thicknesses of the first transparent film and the second transparent film were less than the lower limit value of the range defined in the invention had a problem in which the transparent electrode pattern is visually recognized.

The transparent laminates of Comparative Examples 8 and 10 in which the film thicknesses of the first transparent film and the second transparent film were greater than the upper limit value of the range defined in the invention had a problem in which the transparent electrode pattern is visually recognized.

The transparent laminates of Comparative Example 3 and 11 in which no metal oxide particles were contained because the second transparent film was formed by sputtering had a problem in which the transparent electrode pattern is visually recognized.

The transparent laminate of Comparative Example 15 in which no second transparent film was provided had a problem in which the transparent electrode pattern is visually recognized.

Furthermore, it was confirmed that similarly, the case in which a transparent laminate was manufactured in the same manner as in Example 1, except that a third transparent film having the same refractive index as a transparent substrate was provided, and then a first transparent film was formed thereon in the manufacturing of the transparent laminate of Example 1 did not also have a problem in which the transparent electrode pattern is visually recognized.

Furthermore, the content of the metal oxide particles of the first transparent film or the second transparent film of the transparent laminate of each of the examples and the comparative examples was measured through the following method, and the values described in the above Table 4 were obtained.

A cross-section of the transparent laminate is cut, and then observed using a transmission electron microscope (TEM). A proportion of the area occupied by the metal oxide particles in the cross-sectional area of the first transparent film and the second transparent film is measured at arbitrary three points in the layer, and an average thereof is regarded as a volume fraction (VR).

The volume fraction (VR) and a weight fraction (WR) are converted by the following expression, and thus the weight fraction (WR) of the metal oxide particles in the first transparent film and the second transparent film is calculated.

$$WR = 1/(1.1*(1/(D*VR)-1)+1)$$

D: Specific gravity of metal oxide particles

When the metal oxide particles are titanium oxide particles, D is 4.0, and when the metal oxide particles are zirconium oxide particles, D is 6.0 for calculation.

The content of the metal oxide particles of the first transparent film and the second transparent film of the transparent laminate of each of the examples and the comparative examples can also be measured from the compositions of the transparent films of the above Tables 1 and 3.

Examples 101 to 105 and 107 to 111 and
Comparative Examples 101 to 105: and 107 to 115

Manufacturing of Capacitance Type Input Device

<<Formation of Mask Layer>>
[Preparation of Photosensitive Film K1 for Mask Layer Formation]

Using a slit-shaped nozzle, a thermoplastic resin layer coating liquid having the above-described prescription H1 was coated and dried on a polyethylene terephthalate film temporary support having a thickness of 75 Next, an intermediate layer coating liquid having the above-described prescription P1 was coated and dried thereon. Furthermore, a black photocurable resin layer coating liquid having the following prescription K1 was coated and dried thereon. In this manner, on the temporary support, a thermoplastic resin layer having a dried film thickness of 15.1 μm, an intermediate layer having a dried film thickness of 1.6 μm, and a black photocurable resin layer having a dried film thickness of 2.2 μm to have an optical density of 4.0 were provided, and finally, a protective film (a polypropylene film having a thickness of 12 μm) was pressure-bonded thereto. Therefore, a transfer material in which the temporary support, the thermoplastic resin layer, the intermediate layer (oxygen blocking film), and the black photocurable resin layer were formed integrally with each other was produced, and the sample name was determined as a photosensitive film K1 for mask layer formation.

(Black Photocurable Resin Layer Coating Liquid: Prescription K1)
K-pigment Dispersion 1: 31.2 parts by mass
R-pigment Dispersion 1 (the following composition): 3.3 parts by mass
MMPGAc (manufactured by Daicel Corporation): 6.2 parts by mass
Methyl Ethyl Ketone (manufactured by Tonen Chemical Corporation): 34.0 parts by mass
Cyclohexanone (manufactured by Kanto Denka Kogyo Co., Ltd.): 8.5 parts by mass
Binder 2 (random copolymer having a molar ratio of 78/22 (benzyl methacrylate/methacrylic acid), weight average molecular weight: 38,000): 10.8 parts by mass Phenothiazine (manufactured by Tokyo Chemical Industry Co., Ltd.): 0.01 parts by mass
Propylene Glycol Monomethyl Ether Acetate Solution (76 mass %) of Dipentaerythritol Hexaacrylate (DPHA, manufactured by Nippon Kayaku Co., Ltd.): 5.5 parts by mass
2,4-Bis(Trichloromethyl)-6-[4'-(N,N-Bis(Ethoxycarbonylmethyl)Amine-3'-Bromophenyl)-s-Triazine: 0.4 parts by mass
Surfactant (product name: Megafac F-780F, manufactured by DIC Corporation): 0.1 parts by mass The viscosity of the black photocurable resin layer coating liquid K1 at 100° C. after solvent removal was 10,000 Pa·sec.

(Composition of K-pigment Dispersion 1)
Carbon Black (product name: Nipex 35, manufactured by Evonik Degussa Japan Co., Ltd.): 13.1 mass %
The following Dispersant 1: 0.65 mass %
Binder 1 (random copolymer having a molar ratio of 72/28 (benzyl methacrylate/methacrylic acid), weight average molecular weight: 37,000): 6.72 mass %
Propylene Glycol Monomethyl Ether Acetate: 79.53 mass %

[Chem. 2]

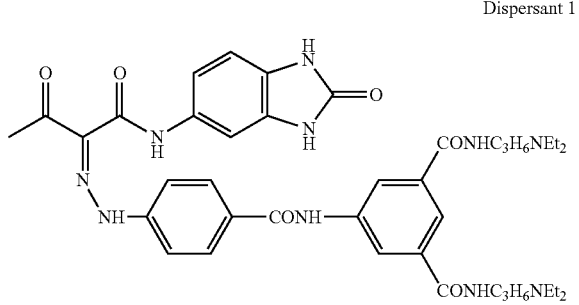

Dispersant 1

—Composition of R-pigment Dispersion 1—
Pigment (C.I. Pigment Red 177; C.I. is an abbreviation for Colour Index International): 18 mass %
Binder 1 (random copolymer having a molar ratio of 72/28 (benzyl methacrylate/methacrylic acid), weight average molecular weight: 37,000): 12 mass % Propylene Glycol Monomethyl Ether Acetate: 70 mass %

[Formation of Mask Layer]

Strengthened glass (300 mm×400 mm×0.7 mm) in which an opening portion (15 mmΦ) was formed was washed using a rotation brush having nylon hair while spraying a glass washing agent liquid adjusted to 25° C. by shower for 20 seconds, and after pure water shower washing, a silane coupling liquid (a 0.3 mass % aqueous solution of N-β (aminoethyl)γ-aminopropyltrimethoxysilane, product name: KBM603, manufactured by Shin-Etsu Chemical Co., Ltd.) was sprayed for 20 seconds by shower to perform pure water shower washing. This base material was heated for 2 minutes at 140° C. using a base material preheating device. In the obtained silane coupling-treated glass base material, the cover film was removed from the photosensitive film K1 for mask layer formation obtained from the above description, and a surface of the black photocurable resin layer exposed after the removal and a surface of the silane coupling-treated glass base material were overlapped with each other so as to be brought into contact with each other, and were laminated on the base material heated at 140° C. using a laminator (manufactured by Hitachi Industries Co., Ltd. (Lamic II)) under conditions of a rubber roller temperature of 130° C., a linear pressure of 100 N/cm, and a transport speed of 2.2 m/min. Next, the polyethylene terephthalate temporary support was peeled in an interface with the thermoplastic resin layer and removed. After the temporary support was peeled, a distance between a surface of an exposure mask and the black photocurable resin layer was set to 200 µm, and pattern exposure was performed with an exposure of 70 mJ/cm² (i-rays) using a proximity type exposure machine (manufactured by Hitachi High-Technologies Corporation) having an ultrahigh pressure mercury lamp in a state in which the base material and the exposure mask (a quartz exposure mask having a frame pattern) stood upright.

Next, using a triethanol amine-based developing liquid (containing 30 mass % of triethanol amine, a liquid obtained by diluting T-PD2 (product name, manufactured by Fujifilm Corporation) 10 folds with pure water), shower development was performed at 33° C. for 60 seconds with a flat nozzle pressure of 0.1 MPa, and the thermoplastic resin layer and the intermediate layer were removed. Then, air was blown to the upper surface of the glass base material to drain the liquid, and then pure water was sprayed for 10 seconds by shower to perform pure water shower washing, and air was blown to reduce the liquid pool on the base material.

Thereafter, development was performed for 45 seconds using a sodium carbonate/sodium hydrogen carbonate-based developing liquid (a liquid obtained by diluting T-CD1 (product name, manufactured by Fujifilm Corporation) 5 folds with pure water) at 32° C. with a shower pressure set to 0.1 MPa, and washing was performed with pure water.

Next, a surfactant-containing washing liquid (a liquid obtained by diluting T-SD3 (product name, manufactured by Fujifilm Corporation) 10 folds with pure water) was used and sprayed by shower at 33° C. for 20 seconds with a conical nozzle pressure of 0.1 MPa, and the formed pattern image was rubbed with a rotation brush having soft nylon hair to remove residues. Ultrapure water was jetted using an ultrahigh pressure washing nozzle with a pressure of 9.8 MPa to further remove residues.

Next, post-exposure was performed with an exposure of 1,300 mJ/cm² under the atmosphere, and a post-baking treatment was performed for 80 minutes at 240° C. to obtain a front face plate on which a mask layer having an optical density of 4.0 and a film thickness of 2.0 µm was formed.

<<First Transparent Film>>

On the front face plate on which the mask layer was formed, a first transparent film was formed in the same manner as in Examples 1 to 5 and 7 to 11 and Comparative Examples 1 to 5 and 7 to 15.

<<Formation of First Transparent Electrode Pattern>>

[Formation of Transparent Electrode Layer]

The front face plate on which the mask layer and the first transparent film were formed was introduced into a vacuum chamber, and an ITO thin film having a thickness of 40 nm was formed thereon using an ITO target (indium:tin=95:5 (molar ratio)) having a SnO₂ content of 10 mass % through DC magnetron sputtering (conditions: base material temperature of 250° C., argon pressure of 0.13 Pa, oxygen pressure of 0.01 Pa) to obtain a front face plate having a transparent electrode layer formed thereon. The surface resistance of the ITO thin film was 80 Ω/□.

[Preparation of Photosensitive Film E1 for Etching]

A photosensitive film E1 for etching was obtained in the same manner as in the preparation of the photosensitive film K1 for mask layer formation, except that the black photocurable resin layer coating liquid was replaced with a coating liquid for a photocurable resin layer for etching having the following prescription E1 in the preparation of the photosensitive film K1 for mask layer formation (the photocurable resin layer for etching had a film thickness of 2.0 μm).

(Coating Liquid for Photocurable Resin Layer for Etching: Prescription E1)

Methyl Methacrylate/Styrene/Methacrylic Acid Copolymer (copolymer composition (mass %): 31/40/29, mass average molecular weight: 60,000, acid value: 163 mgKOH/g): 16 parts by mass Monomer 1 (product name: BPE-500, manufactured by Shin-Nakamura Chemical Co., Ltd.): 5.6 parts by mass 0.5 mol Adduct of Tetraethylene Oxide Monomethacrylate of Hexamethylenediisocyanate: 7 parts by mass Cyclohexanedimethanol Monoacrylate as Compound Having One Polymerizable Group in Molecule: 2.8 parts by mass 2-Chloro-N-Butyl Acridone: 0.42 parts by mass 2,2-Bis(o-Chlorophenyl)-4,4',5,5'-Tetraphenyl Biimidazole: 2.17 parts by mass Malachite Green Oxalate: 0.02 parts by mass Leuco Crystal Violet: 0.26 parts by mass Phenothiazine: 0.013 parts by mass Surfactant (product name: Megafac F-780F, manufactured by DIC Corporation): 0.03 parts by mass Methyl Ethyl Ketone: 40 parts by mass 1-Methoxy-2-Propanol: 20 parts by mass The viscosity of the coating liquid E1 for a photocurable resin layer for etching at 100° C. after solvent removal was 2,500 Pa·sec.

[Formation of First Transparent Electrode Pattern]

In the same manner as in the formation of the mask layer, the front face plate on which the mask layer, the first transparent film, and the transparent electrode layer were formed was washed, and a photosensitive film E1 for etching from which a cover film was removed was laminated thereon (base material temperature: 130° C., rubber roller temperature: 120° C., linear pressure: 100 N/cm, transport speed: 2.2 m/min). After peeling of the temporary support, a distance between a surface of an exposure mask (a quartz exposure mask having a transparent electrode pattern) and the photocurable resin layer for etching was set to 200 μm, and pattern exposure was performed with an exposure of 50 mJ/cm² (i-rays).

Next, using a triethanol amine-based developing liquid (containing 30 mass % of triethanol amine, a liquid obtained by diluting T-PD2 (product name, manufactured by Fujifilm Corporation) 10 folds with pure water), a treatment was performed for 100 seconds at 25° C., and using a surfactant-containing washing liquid (a liquid obtained by diluting T-SD3 (product name, manufactured by Fujifilm Corporation) 10 folds with pure water), a treatment was performed for 20 seconds at 33° C. Residues were removed using a rotation brush and an ultrahigh pressure washing nozzle, and a post-baking treatment was performed for 30 minutes at 130° C. to obtain a front face plate on which the transparent electrode layer and the photocurable resin layer pattern for etching were formed.

The front face plate on which the transparent electrode layer and the photocurable resin layer pattern for etching were formed was dipped in an etching tank containing an ITO etchant (an aqueous solution of hydrochloric acid and potassium chloride, liquid temperature: 30° C.) and treated for 100 seconds to dissolve and remove the transparent electrode layer in an exposed region which was not covered with the photocurable resin layer for etching, and thus a front face plate with the transparent electrode layer pattern having the photocurable resin layer pattern for etching was obtained.

Next, the front face plate with the transparent electrode layer pattern having the photocurable resin layer pattern for etching was dipped in a resist peeling tank containing a resist peeling liquid (N-methyl-2-pyrrolidone, monoethanolamine, surfactant (product name: Surfynol 465, manufactured by Air Products and Chemicals, Inc.), liquid temperature: 45° C.) and treated for 200 seconds to remove the photocurable resin layer for etching, and thus a front face plate in which the mask layer, the first transparent film, and the first transparent electrode pattern were formed was obtained.

<<Formation of Insulating Layer>>

[Preparation of Photosensitive Film W1 for Insulating Layer Formation]

A photosensitive film W1 for insulating layer formation was obtained in the same manner as in the preparation of the photosensitive film K1 for mask layer formation, except that the black photocurable resin layer coating liquid was replaced with a coating liquid for a photocurable resin layer for an insulating layer having the following prescription W1 in the preparation of the photosensitive film K1 for mask layer formation (the photocurable resin layer for an insulating layer had a film thickness of 1.4 μm).

(Insulating Layer Forming Coating Liquid: Prescription W1)

Binder 3 (1-methoxy-2-propanol of glycidyl methacrylate adduct (d) of cyclohexyl methacrylate (a)/methyl methacrylate (b)/methacrylic acid copolymer (c) (composition (mass %):a/b/c/d=46/1/10/43, mass average molecular weight: 36,000, acid value: 66 mgKOH/g), methyl ethyl ketone solution (solid content: 45%)): 12.5 parts by mass Propylene Glycol Monomethyl Ether Acetate Solution (76 mass %) of Dipentaerythritol Hexaacrylate (DPHA, manufactured by Nippon Kayaku Co., Ltd.): 1.4 parts by mass Urethane-based Monomer (product name: NK Oligo UA-32P, manufactured by Shin-Nakamura Chemical Co., Ltd., non-volatile content: 75%, propylene glycol monomethyl ether acetate: 25%): 0.68 parts by mass Tripentaerythritol Octaacrylate (product name: V#802, manufactured by Osaka Organic Chemical Industry Ltd.): 1.8 parts by mass Diethylthioxanthone: 0.17 parts by mass 2-(Dimethylamino)-2-[(4-Methylphenyl)Methyl]-1-[4-(4-Morpholinyl)Phenyl]-1-Butanone (product name: Irgacure 379, manufactured by BASF): 0.17 parts by mass Dispersant (product name: Solsperse 20000, manufactured by Avecia): 0.19 parts by mass Surfactant (product name: Megafac F-780F, manufactured by DIC Corporation): 0.05 parts by mass Methyl Ethyl Ketone: 23.3 parts by mass MMPGAc (manufactured by Daicel Corporation): 59.8 parts by mass The viscosity of the insulating layer forming coating liquid W1 at 100° C. after solvent removal was 4,000 Pa·sec.

In the same manner as in the formation of the mask layer, the front face plate with the mask layer, the first transparent film, and the first transparent electrode pattern was washed and silane-coupling-treated, and a photosensitive film W1 for insulating layer formation from which a cover film was removed was laminated thereon (base material temperature: 100° C., rubber roller temperature: 120° C., linear pressure: 100 N/cm, transport speed: 2.3 m/min). After peeling of the temporary support, a distance between a surface of an exposure mask (a quartz exposure mask having an insulating layer pattern) and the photocurable resin layer for etching was set to 100 µm, and pattern exposure was performed with an exposure of 30 mJ/cm$^2$ (i-rays).

Next, using a triethanol amine-based developing liquid (containing 30 mass % of triethanol amine, a liquid obtained by diluting T-PD2 (product name, manufactured by Fujifilm Corporation) 10 folds with pure water), a treatment was performed for 60 seconds at 33° C., using a sodium carbonate/sodium bicarbonate-based developing liquid (a liquid obtained by diluting T-CD1 (product name, manufactured by Fujifilm Corporation) 5 folds with pure water), a treatment was performed for 50 seconds at 25° C., and using a surfactant-containing washing liquid (a liquid obtained by diluting T-SD3 (product name, manufactured by Fujifilm Corporation) 10 folds with pure water), a treatment was performed for 20 seconds at 33° C. Residues were removed using a rotation brush and an ultrahigh pressure washing nozzle, and a post-baking treatment was performed for 60 minutes at 230° C. to obtain a front face plate on which the mask layer, the first transparent film, the first transparent electrode pattern, and the insulating layer pattern were formed.

<<Formation of Second Transparent Electrode Pattern>>

[Formation of Transparent Electrode Layer]

In the same manner as in the formation of the first transparent electrode pattern, the front face plate on which the mask layer, the first transparent film, the first transparent electrode pattern, and the insulating layer pattern were formed was subjected to DC magnetron sputtering (conditions: base material temperature of 50° C., argon pressure of 0.13 Pa, oxygen pressure of 0.01 Pa) to form an ITO thin film having a thickness of 80 nm, and a front face plate having a transparent electrode layer formed thereon was obtained. The surface resistance of the ITO thin film was 110 Ω/□.

In the same manner as in the formation of the formation of the first transparent electrode pattern, a front face plate in which the mask layer, the first transparent film, the first transparent electrode pattern, the insulating layer pattern, the transparent electrode layer, and the photocurable resin layer pattern for etching were formed was obtained using a photosensitive film E1 for etching (post-baking treatment: 130° C., 30 minutes).

Furthermore, in the same manner as in the formation of the formation of the first transparent electrode pattern, a front face plate in which the mask layer, the first transparent film, the first transparent electrode pattern, the insulating layer pattern, and the second transparent electrode pattern were formed was obtained by performing etching (30° C., 50 seconds) and by removing the photocurable resin layer for etching (45° C., 200 seconds).

<<Formation of Separate Conductive Element from First and Second Transparent Electrode Patterns>>

In the same manner as in the formation of the first and second transparent electrode patterns, a front face plate in which the mask layer, the first transparent film, the first transparent electrode pattern, the insulating layer pattern, and the second transparent electrode pattern were formed was subjected to DC magnetron sputtering to obtain a front face plate on which an aluminum (Al) thin film having a thickness of 200 nm was formed.

In the same manner as in the formation of the first and second transparent electrode patterns, a front face plate in which the mask layer, the first transparent film, the first transparent electrode pattern, the insulating layer pattern, the second transparent electrode pattern, and the photocurable resin layer pattern for etching were formed was obtained using a photosensitive film E1 for etching (post-baking treatment: 130° C., 30 minutes).

Furthermore, in the same manner as in the formation of the formation of the first transparent electrode pattern, a front face plate in which the mask layer, the first transparent film, the first transparent electrode pattern, the insulating layer pattern, the second transparent electrode pattern, and the separate conductive element from the first and second transparent electrode patterns were formed was obtained by performing etching (30° C., 50 seconds) and by removing the photocurable resin layer for etching (45° C., 200 seconds).

<<Second Transparent Film>>

A second transparent film was formed on the front face plate in which the mask layer, the first transparent film, the first transparent electrode pattern, the insulating layer pattern, the second transparent electrode pattern, and the separate conductive element from the first and second transparent electrode patterns were formed in the same manner as in Examples 1 to 5 and 7 to 11 and Comparative Examples 1 to 5 and 7 to 15.

<<Formation of Transparent Protective Layer>>

In the same manner as in the formation of the insulating layer, a photosensitive film W1 for insulating layer formation from which a cover film was removed was laminated on the front face plate on which the second transparent film was formed, and after peeling of the temporary support, front face exposure was performed with an exposure of 50 mJ/cm$^2$ (i-rays) without using an exposure mask, and development, post-exposure (1,000 mJ/cm$^2$), and a post-baking treatment were performed to obtain capacitance type input devices (front face plates) of Examples 101 to 105 and 107 to 111 and Comparative Examples 101 to 105 and 107 to 115 in which the insulating layer (transparent protective layer) was laminated to cover all of the mask layer, the first transparent film, the first transparent electrode pattern, the insulating layer pattern, the second transparent electrode pattern, the separate conductive element from the first and second transparent electrode patterns, and the second transparent film.

<<Production of Image Forming Device (Touch Panel)>>

Each of the front face plates of Examples 101 to 105 and 107 to 111 and Comparative Examples 101 to 105 and 107 to 115 manufactured in advance was bonded to a liquid crystal display element manufactured through the method described in JP2009-47936A to produce image display devices of Examples 101 to 105 and 107 to 111 and Comparative Examples 101 to 105 and 107 to 115 provided with the capacitance type input device as a constituent element through a known method.

<<Evaluation for Front Face Plate and Image Display Device>>

The capacitance type input devices and the image display devices of Examples 101 to 105 and 107 to 111 did not have a problem in which the transparent electrode pattern was visually recognized.

In the above-described processes, the front face plate 1 on which the mask layer, the first transparent film, the first transparent electrode pattern, the insulating layer pattern, the second transparent electrode pattern, the separate conductive element from the first and second transparent electrode patterns, and the second transparent film were formed had no contamination in the opening portion and on the rear surface, and thus it was easy to wash and had no problems in contamination of other members.

In addition, the mask layer had no pin holes and was thus excellent in light shieldability.

The first transparent electrode pattern, the second transparent electrode pattern, and the separate conductive element therefrom had no problems in conductivity, and an insulating property was provided between the first transparent electrode pattern and the second transparent electrode pattern.

Furthermore, the transparent protective layer had no defects such as bubbles, and thus an image display device having excellent display characteristics was obtained.

What is claimed is:

1. A transparent laminate
comprising a region where a transparent substrate; a first transparent film which contains a metal oxide and has a film thickness of 55 nm to 110 nm; a transparent electrode pattern; and a second transparent film which contains 5 mass % to 80 mass % of metal oxide particles and has a film thickness of 55 nm to 110 nm are laminated in this order;
wherein the region is included in a plane.

2. A transparent laminate
comprising a region where a transparent substrate; a first transparent film which has a refractive index of 1.6 to 1.78 and a film thickness of 55 nm to 110 nm; a transparent electrode pattern; and a second transparent film which contains 5 mass % to 80 mass % of metal oxide particles and has a film thickness of 55 nm to 110 nm are laminated in this order,
wherein the region is included in a plane.

3. The transparent laminate according to claim 1,
wherein the first transparent film contains 5 mass % to 80 mass % of metal oxide particles as the metal oxide.

4. The transparent laminate according to claim 1,
wherein the metal oxide particles contain at least one of a titanium oxide, a titanium composite oxide, a zinc oxide, a zirconium oxide, an indium tin oxide, and an antimony tin oxide.

5. The transparent laminate according to claim 1,
wherein the metal oxide particles has a refractive index of 1.9 or higher.

6. The transparent laminate according to claim 1,
wherein the metal oxide particles are zirconium oxide particles, and
wherein the second transparent film contains the metal oxide particles in an amount of 40.0 mass % to 80 mass %.

7. The transparent laminate according to claim 1,
wherein the metal oxide particles are zirconium oxide particles, and
wherein the second transparent film contains the metal oxide particles in an amount of 40.0 mass % to 70 mass %.

8. The transparent laminate according to claim 1,
wherein the metal oxide particles are titanium oxide particles, and
wherein the second transparent film contains the metal oxide particles in an amount of 30 mass % to 70 mass %.

9. The transparent laminate according to claim 1,
wherein the second transparent film is a resin film.

10. The transparent laminate according to claim 9,
wherein the second transparent film which is the resin film contains an acrylic resin.

11. The transparent laminate according to claim 1,
wherein both of the transparent electrode pattern and a non-pattern region where the transparent electrode pattern is not formed are continuously covered with the first transparent film and the second transparent film directly or via another layer.

12. The transparent laminate according to claim 1,
wherein the first transparent film and the transparent electrode pattern are adjacent to each other.

13. The transparent laminate according to claim 1,
wherein the transparent electrode pattern and the second transparent film are adjacent to each other.

14. The transparent laminate according to claim 1,
wherein at least a part of the non-pattern region where the transparent electrode pattern is not formed includes a region where the transparent substrate, the first transparent film, and the second transparent film are laminated in this order in a plane.

15. The transparent laminate according to claim 14,
wherein the first transparent film and the second transparent film are adjacent to each other in the region where the transparent substrate, the first transparent film, and the second transparent film are laminated in this order.

16. The transparent laminate according to claim 1,
wherein the first transparent film and the second transparent film are made of the same material.

17. The transparent laminate according to claim 1,
wherein the transparent substrate is a glass substrate or a film substrate having a refractive index of 1.5 to 1.55.

18. The transparent laminate according to claim 1,
wherein at least one of the first transparent film and the second transparent film is a transparent resin film.

19. The transparent laminate according to claim 1,
wherein at least one of the first transparent film and the second transparent film is formed by transferring a transparent curable resin film formed on a temporary support onto the transparent substrate.

20. The transparent laminate according to claim 1,
wherein the first transparent film is formed by sputtering.

21. The transparent laminate according to claim 1,
wherein the first transparent film is a mixed film of $SiO_2$ and $Nb_2O_5$ formed by sputtering.

22. A capacitance type input device comprising:
the transparent laminate according to claim 1.

23. An image display device comprising:
the capacitance type input device according to claim 22 as a constituent element.

24. A transparent laminate comprising a region where a transparent substrate; a first transparent film which contains a metal oxide and has a film thickness of 55 nm to 110 nm; a transparent electrode pattern; and a second transparent film which contains 5 mass % to 80 mass % of metal oxide particles and has a film thickness of 55 nm to 110 nm are laminated in this order,
wherein the region is included in a plane, and
wherein the first transparent film and the transparent electrode pattern are directly adjacent to each other.

25. A transparent laminate comprising a region where a transparent substrate; a first transparent film which contains a metal oxide and has a film thickness of 55 nm to 110 nm; a transparent electrode pattern; and a second transparent film which contains 5 mass % to 80 mass % of metal oxide particles and has a film thickness of 55 nm to 110 nm are laminated in this order,
wherein the region is included in a plane, and
wherein the transparent electrode pattern and the second transparent film are directly adjacent to each other.

26. A transparent laminate comprising a region where a transparent substrate; a first transparent film which contains a metal oxide and has a film thickness of 55 nm to 110 nm; a transparent electrode pattern; and a second transparent film which contains 5 mass % to 80 mass % of metal oxide particles and has a film thickness of 55 nm to 110 nm are laminated in this order, wherein the region is included in a plane, wherein a transparent protective film is formed on a surface of the second transparent film opposite a surface on which the transparent electrode pattern is formed, wherein the transparent protective film is obtained by curing a photosensitive layer, wherein a thickness of the transparent protective film is 0.1 μm to 10 μm, and wherein the second transparent film and the transparent protective film are directly adjacent to each other.

* * * * *